(12) United States Patent
Han et al.

(10) Patent No.: US 10,649,791 B2
(45) Date of Patent: May 12, 2020

(54) METHOD FOR AN INITIAL SETUP AND ELECTRONIC DEVICE THEREOF

(71) Applicant: Samsung Electronics Co., Ltd, Gyeonggi-do (KR)

(72) Inventors: Insil Han, Seoul (KR); Hyunyeul Lee, Seoul (KR); Sholudko Oleksandr, Gyeonggi-do (KR); Na-Woong Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 15/210,820

(22) Filed: Jul. 14, 2016

(65) Prior Publication Data

US 2017/0017376 A1    Jan. 19, 2017

(30) Foreign Application Priority Data

Jul. 14, 2015 (KR) .................. 10-2015-0099888

(51) Int. Cl.
| | | |
|---|---|---|
| *G06F 9/445* | (2018.01) | |
| *G06F 3/0481* | (2013.01) | |
| *G06F 3/0488* | (2013.01) | |
| *G06F 9/451* | (2018.01) | |

(52) U.S. Cl.
CPC ........ *G06F 9/44505* (2013.01); *G06F 3/0488* (2013.01); *G06F 3/04817* (2013.01); *G06F 9/445* (2013.01); *G06F 9/453* (2018.02); *G06F 9/454* (2018.02)

(58) Field of Classification Search
CPC .... G06F 3/04817; G06F 9/454; G06F 9/4401; G06F 3/0488; H04L 41/0806
See application file for complete search history.

(56) References Cited

U.S. PATENT DOCUMENTS

| | | | |
|---|---|---|---|
| 2003/0103088 A1* | 6/2003 | Dresti .................. | G06F 3/0481 715/835 |
| 2008/0168159 A1* | 7/2008 | Branson ................ | H04L 67/125 709/220 |
| 2010/0321323 A1* | 12/2010 | Kim ...................... | G06F 3/0418 345/173 |

(Continued)

FOREIGN PATENT DOCUMENTS

| | | |
|---|---|---|
| JP | 2012-239231 | 12/2012 |
| KR | 10-2014-0118741 | 10/2014 |
| WO | WO 2014/157874 A1 | 10/2014 |

OTHER PUBLICATIONS

Richard Petersen, "Beginning Fedora Desktop: Fedora 20 Edition", Jun. 2014, Apress, All pages (Year: 2014).*

(Continued)

*Primary Examiner* — Kieu D Vu
*Assistant Examiner* — Roberto Borja

(57) ABSTRACT

Various embodiments of the present disclosure relate to an apparatus and method for performing an initial setup on an electronic device. An embodiment of the disclosed method for operating an electronic device may include performing initial booting of the electronic device and displaying at least one icon for the initial setup of the electronic device. Other embodiments of this disclosure include further operations beyond the displaying at least one icon for the initial setup.

18 Claims, 63 Drawing Sheets

(56) References Cited

U.S. PATENT DOCUMENTS

| | | | | |
|---|---|---|---|---|
| 2011/0125561 | A1* | 5/2011 | Marcus | G06Q 20/32 |
| | | | | 705/14.15 |
| 2012/0162160 | A1* | 6/2012 | Amano | G06F 9/451 |
| | | | | 345/204 |
| 2013/0111328 | A1* | 5/2013 | Khanna | G06F 16/958 |
| | | | | 715/234 |
| 2013/0184029 | A1 | 7/2013 | Lim et al. | |
| 2014/0089833 | A1* | 3/2014 | Hwang | G06F 3/04817 |
| | | | | 715/769 |
| 2014/0101034 | A1* | 4/2014 | Tanner | G06Q 20/10 |
| | | | | 705/39 |
| 2014/0298393 | A1* | 10/2014 | Kim | H04N 21/6547 |
| | | | | 725/110 |
| 2014/0372625 | A1 | 12/2014 | Dureau | |
| 2015/0058744 | A1* | 2/2015 | Dhingra | G06F 9/451 |
| | | | | 715/747 |
| 2015/0350403 | A1* | 12/2015 | Eim | G06F 1/163 |
| | | | | 455/420 |
| 2015/0378558 | A1* | 12/2015 | Smith | G06F 3/04817 |
| | | | | 715/777 |
| 2016/0011775 | A1* | 1/2016 | Guo | G06F 3/04817 |
| | | | | 715/765 |

OTHER PUBLICATIONS

Blackberry, "Setting up Your Device—BlackBerry Q5", http://help.blackberry.com/en/blackberry-qu/current/help/hjo1393009575688.html, Jun. 16, 2016, 3 pages.

\* cited by examiner

METHOD FOR AN INITIAL SETUP AND ELECTRONIC DEVICE THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2015-0099888, which was filed in the Korean Intellectual Property Office on Jul. 14, 2015, the entire content of which is hereby incorporated by reference.

TECHNICAL FIELD

Various embodiments of the present disclosure relate to an apparatus and method for performing an initial setup in an electronic device.

BACKGROUND

With the development of information and communication technologies and semiconductor technologies, various types of electronic devices have developed into multimedia devices that provide various multimedia services. For example, portable electronic devices may provide diverse multimedia services such as broadcast services, wireless Internet services, camera services, and music playback services.

During initial booting, the electronic device may perform a series of operations for an initial setup of the electronic device. Since the electronic device may provide various multimedia services, a series of operations for the initial setup may increase. For example, during the initial booting, the electronic device may successively provide, to a user, a series of operations for the initial setup such as language selection, signal reception method selection, network connection method selection, a use agreement request for an electronic device, an account setting request, and the like.

During the initial setup of the electronic device, a user of the electronic device may successively execute and omit a series of operations for the initial setup of the electronic device to display a home screen, thereby using at least one function provided by the electronic device. Accordingly, a series of operations for the initial setup may be a factor for affecting the usability of the electronic device by a user who does not require the initial setup.

When at least a part of the settings of the series of operations for the initial setup is omitted, the user of the electronic device has an inconvenience of individually selecting the corresponding setting for menu search in order to set the omitted settings later.

SUMMARY

To address the above-discussed deficiencies, it is a primary object to provide an apparatus and method for performing an initial setup of an electronic device using an icon on a home screen in the electronic device.

According to various embodiments of the present disclosure, an electronic device comprises: a touch screen; and at least one processor electrically connected to the touch screen, wherein the at least one processor is configured to: perform initial booting of the electronic device; and display at least one icon for an initial setup of the electronic device, and the at least one icon is movable based on a touch input detected through the touch screen.

According to various embodiments of the present disclosure, a method for operating an electronic device comprising: performing initial booting of the electronic device; and displaying at least one icon for an initial setup of the electronic device, and the at least one icon is movable based on a touch input detected through the touch screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
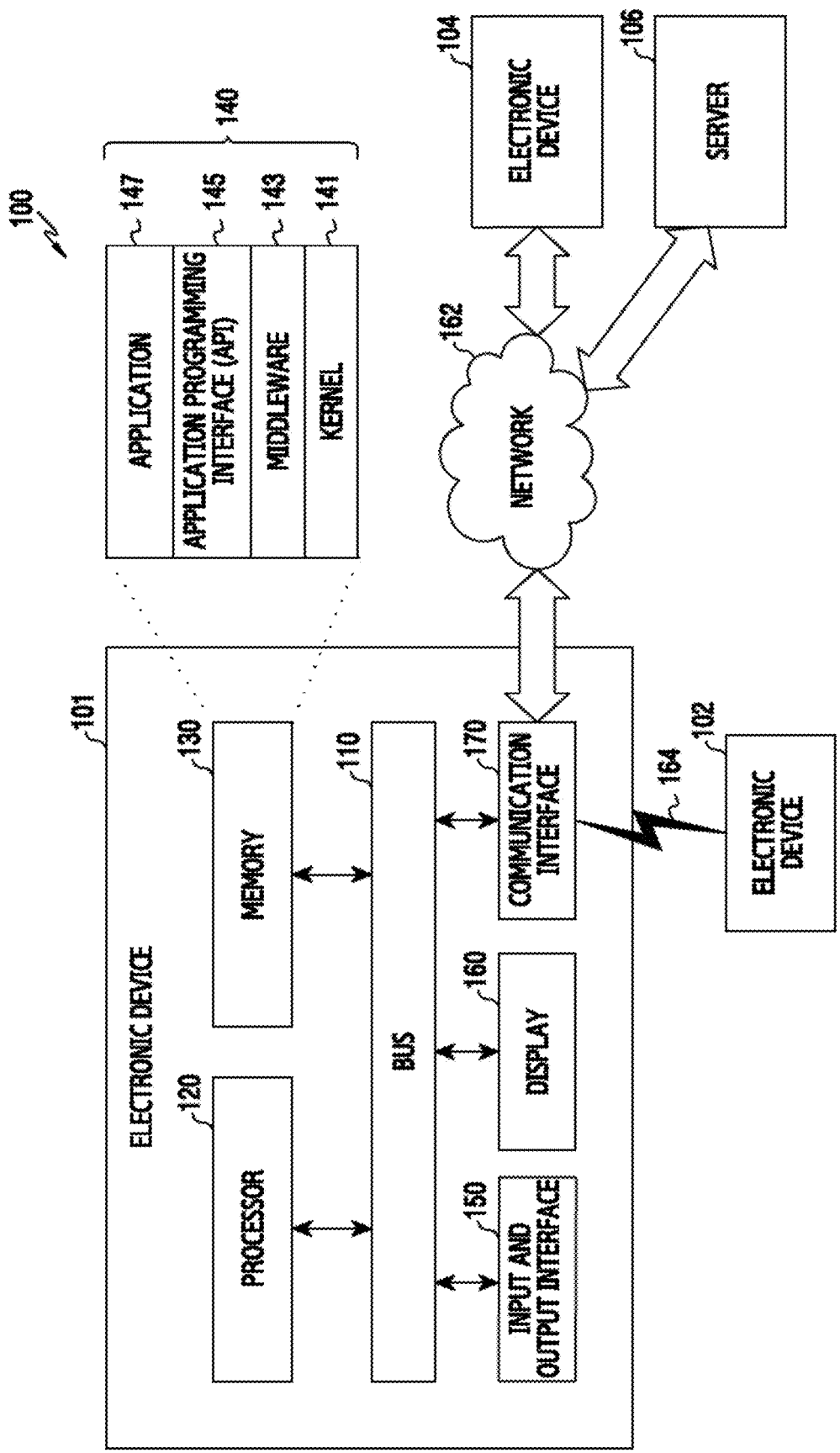
FIG. 1 illustrates an electronic device in a network environment according to various embodiments of the present disclosure.

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Referring to FIG. 1, in various embodiments, an electronic device 101 within a network environment 100 is illustrated. The electronic device 101 may include a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). In some embodiments, the electronic device 101 may omit at least one of the above elements or may further include other elements.

The bus 110 may include, for example, a circuit for interconnecting the elements 120 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

According to an embodiment, the processor 120 may control the electronic device 101 to perform an initial setup thereof by using a plotter icon displayed on the display 160. For example, during the initial booting of the electronic device 101, the processor 120 may control the electronic device 101 to perform a language setting and a use agreement procedure. The processor 120 may control the display 160 so as to display at least one plotter icon for the initial setup. Here, an initial boot of the electronic device 101 may include a boot according to an initial power supply of the electronic device 101 or a boot being progressed after the initialization of the electronic device 101.

According to an embodiment, the processor 120 may control the plotter icon displayed on the display unit 160 not to be overlapped with other icons (for example, an application icon and a menu icon). For example, when the plotter icon overlaps other icons, the processor 120 may automatically update the position of the plotter icon based on the input information (for example, drag input) detected through the input/output interface 150 such that the plotter icon is not overlapped with other icons.

According to an embodiment, the processor 120 may control the display 160 to display information related to the application on the plotter icon displayed on the display 160. For example, the processor 120 may move the position of the plotter icon displayed on the display 160 such that the plotter icon corresponds to the input information detected through the input/output interface 150. When the plotter icon moves and adjacent to another icon (such as the application icon), the processor 120 may control the display 160 to change a display parameter of the plotter icon corresponding to the characteristics of another icon. For example, when a plurality of other icons are adjacent to each other, the processor 120 may control the display 160 to change a display parameter for the plotter icon corresponding to each icon. For example, when a distance (minimum or lower distance) between the display region of the plotter icon and the display region of another icon is within a predetermined distance, the processor 120 may determine that the corresponding icons are adjacent to each other. Here, the characteristics of another icon may include the type of an application corresponding to the icon, service characteristics of the application, and the like. The display parameter may include a color, shape, size, and transparency of the plotter icon.

According to an embodiment, when a plurality of icons adjacent to the plotter icon are detected, the processor 120 may select at least one icon for displaying information associated with the plotter icon. For example, the processor 120 may select one of the icons for displaying the associated information on the basis of a contiguous parameter of each of the icons. Here, the contiguous parameter may include the distance between an icon and a plotter icon, whether the icon and plotter icon overlap or not, the size of the overlapping area, and the like.

According to an embodiment, when the plotter icon for an initial setup is displayed on the display 160, the processor 120 may control the initial setup of a plotter icon corresponding to an execution application to be performed. For example, when an input (for example, icon selection input) for the execution of the application is detected, the processor 120 may control a plotter icon associated with the application to be executed. In other words, when the initial setup associated with the application for execution is not complete, the processor 120 may control the display 160 to display a detailed setting window of the corresponding plotter icon. For example, when an input (for example, icon selection input) for the execution of the application is detected, the processor 120 may control the display 160 to display a message identifying whether an initial setting associated with the corresponding application is in progress.

According to an embodiment, the processor 120 may control the plotter icon displayed on the display 160 to be selectively removed based on whether the plotter icon is setting. For example, when the required setup menu (for example, an account setting) of the initial setup menu corresponding to the plotter icon displayed on the display 160 is complete, the processor 120 may activate a delete menu of the plotter icon based on input information detected through the input/output interface 150. When the setup of the required setup menu is not complete, the processor 120 may deactivate the delete menu of the plotter icon.

According to an embodiment, when the initial setup corresponding to the plotter icon displayed on the display 160 is complete, the processor 120 may change the display of the plotter icon. For example, when the initial setup corresponding to the plotter icon displayed on the display 160 is complete, the processor 120 may remove the display of the plotter icon from the display 160. For example, the processor 120 may control the display 160 to modify the plotter icon displayed on the display 160 to the application icon and display the same on the home screen. For example, the processor 120 may hide the plotter icon displayed on the display 160 in at least some areas (for example, an edge area) of the display 160.

The memory 130 may include a volatile memory and/or a non-volatile memory. The memory 130 may store, for example, instructions or data (for example, reference distance) relevant to at least one other element of the electronic device 101. According to an embodiment, the memory 130 may store software and/or a program 140. For example, the program may include a kernel 141, middleware 143, an Application Programming Interface (API) 145, or application (or "application program") 147, etc. At least some of the kernel 141, the middleware 143, and the API 145 may be referred to as an Operating System (OS).

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

According to an embodiment, the input/output interface 150 may receive a touch input, a gesture input, a proximity input, or a hovering input using an electronic pen or a user's body part.

The display 160, for example, may display various types of contents (for example, text, images, videos, icons, or symbols) for the user. For example, the display 160 may configure a touch screen in combination with the input/output interface 150 for detecting touch information.

According to an embodiment, when the language setting and use agreement procedure in the processor 120 are completed, the display unit 160 may display the home screen including at least one plotter icon for an initial setup. For example, the display 160 may display the plotter icon on a presentation layer of the home screen or a separate different presentation layer. For example, when the plotter icon is displayed using a separate different presentation layer, the display 160 may display a separate different presentation layer including the plotter icon on top of the presentation layer of the home screen.

According to an embodiment, the display 160 may update the display location of the plotter icon to correspond to the input information detected through the input/output interface 150. For example, the display 160 may display a visual effect such that the plotter icon is floating in the air or water.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106). For example, the communication interface 170 may communicate with the external device (for example, the first external electronic device 102) through short range communication 164.

The network 162 may include at least one of a communication network such as a computer network (for example, a LAN or a WAN), the Internet, and a telephone network.

Figure 2:
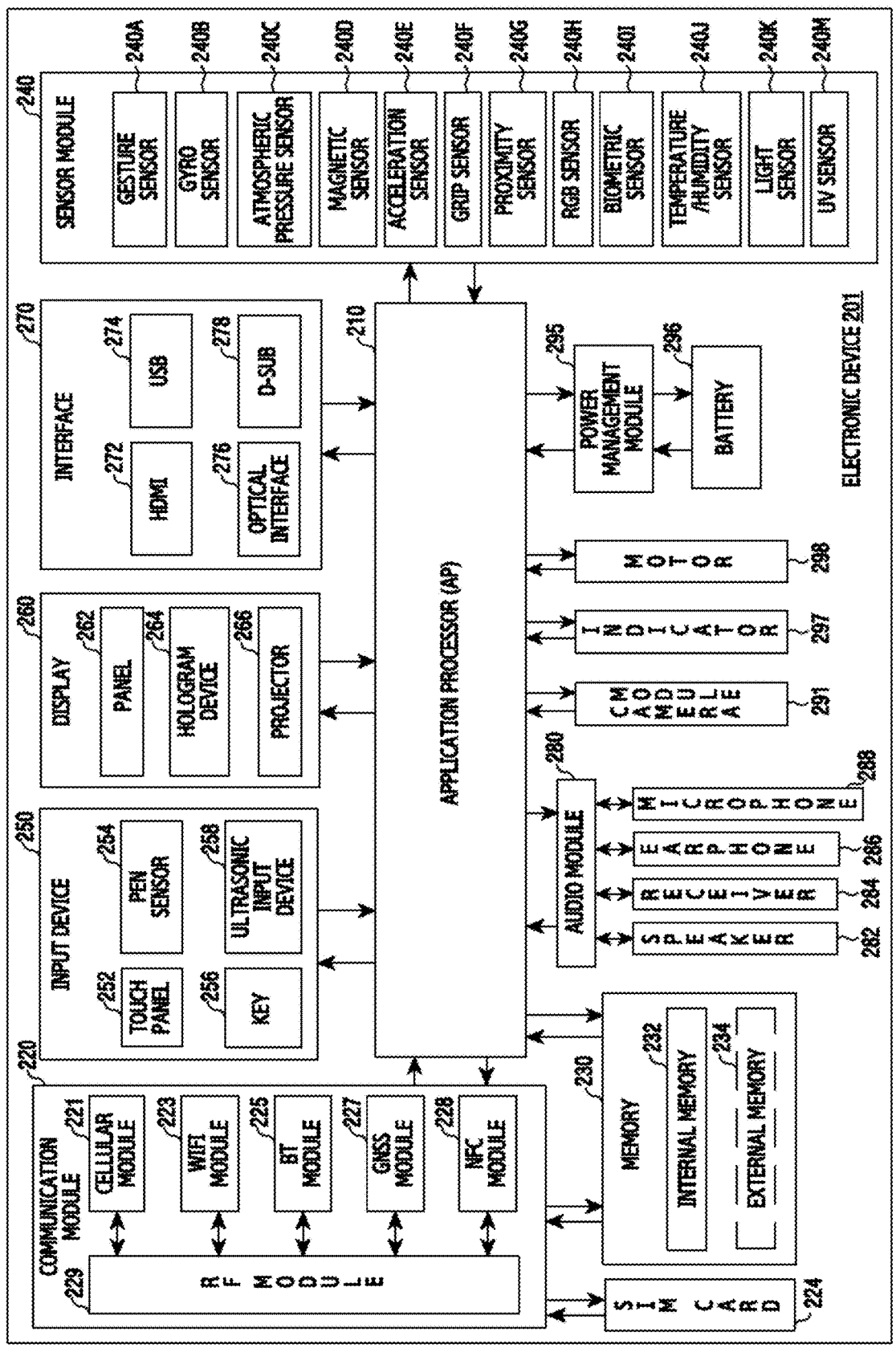
FIG. 2 is a block diagram illustrating an electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an Application Processor (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various pieces of data in a non-volatile memory.

According to an embodiment, the processor 210 may control the display 260 to display at least one plotter icon for the initial setup of the electronic device 201.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass® module, a Beidou® module, or a Galileo® module), an NFC module 228, and a Radio Frequency (RF) module 229.

The cellular module 221 may provide an application call, an image call, a text message service, or an Internet service through, for example, a communication network. According to an embodiment, the cellular module 221 may identify and authenticate the electronic device 201 within a communication network using a subscriber identification module (for example, the SIM card 224). According to another embodiment, the cellular module 221 may perform at least some of the functions that the processor 210 may provide. According to an embodiment, the cellular module 221 may include a Communication Processor (CP).

The Wi-Fi module 223, the Bluetooth® module 225, the GNSS module 227, or the NFC module 228 may include, for example, a processor that processes data transmitted and received through the corresponding module. According to some embodiments, at least some (two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, or a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input unit 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, the microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, in the interior of or on the exterior of the electronic device 201. According to an exemplary embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, the power of the electronic device 201. According to an embodiment, the power management module 295 may include a Power Management Integrated Circuit (PMIC), a charger Integrated Circuit (IC), or a battery or fuel gauge.

The battery 296 (e.g., the battery 190) may include, for example, a rechargeable battery and/or a solar battery. According to an embodiment, the battery 296 may include a plurality of cells that can be connected in series or in parallel.

The indicator 297 may indicate a particular state (for example, a booting state, a message state, a charging state, or the like) of the electronic device 201 or a part (for example, the processor 210) of the electronic device 201. The motor 298 may convert an electrical signal into mechanical vibration, and may generate vibration, a haptic effect, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

According to various embodiments of the present disclosure, the electronic device 101 or 201 may use a separate module different from the processor 120 or 210 and control the electronic device 101 or 201 to perform an initial setup thereof using the plotter icon.

Figure 3:
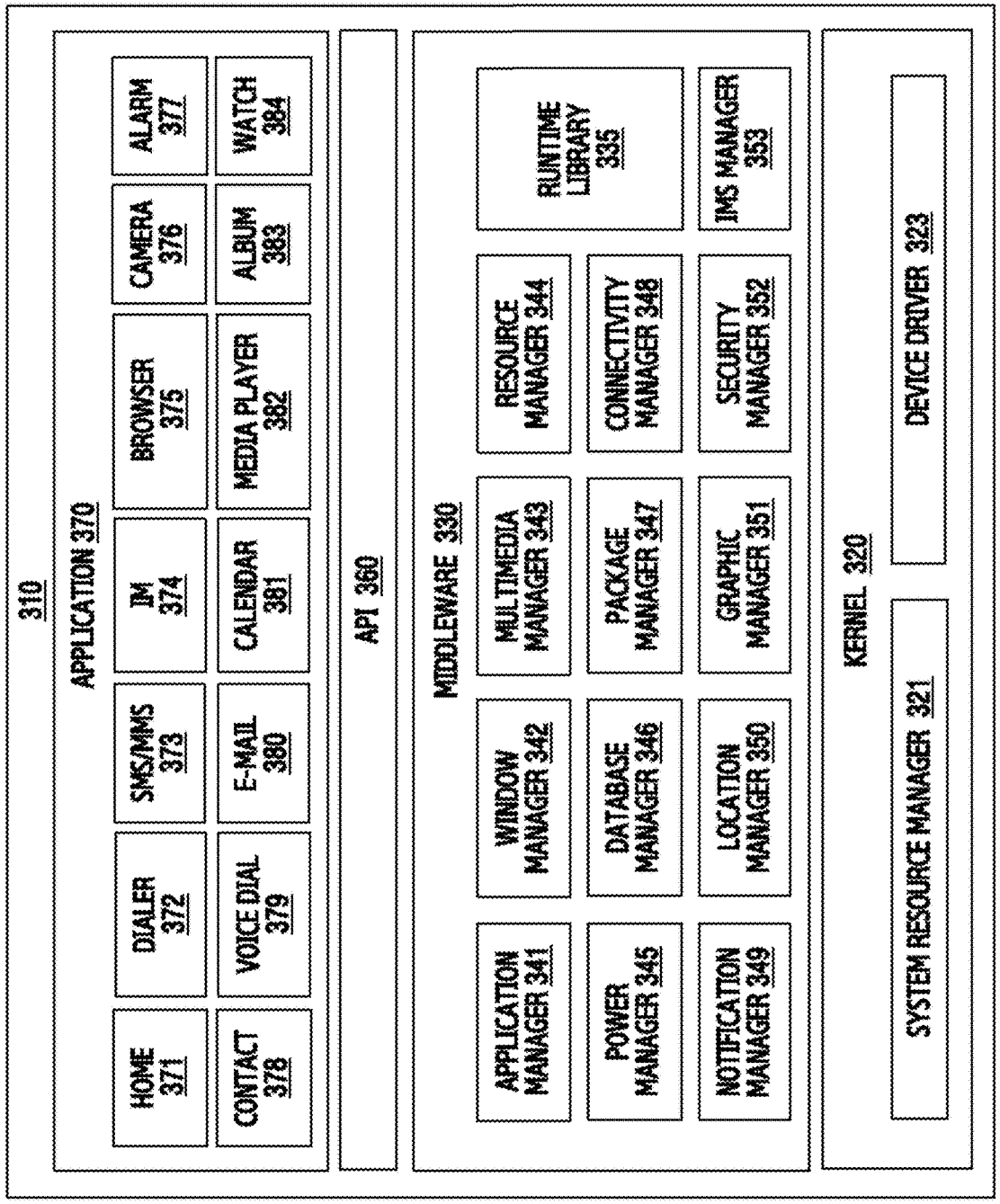
FIG. 3 is a block diagram illustrating a program module according to various embodiments of the present disclosure.

FIG. 3 is a block diagram of a program module according to various embodiments of the present disclosure. According to an embodiment, the program module 310 (for example, the program 140) may include an Operating System (OS) for controlling resources related to the electronic device (for example, the electronic device 101 or 201) and/or various applications (for example, the application programs 147) executed in the operating system. The operating system may be for example, Android®, iOS®, Windows®, Symbian®, Tizen®, Bada®, or the like.

The program module 310 may include a kernel 320, middleware 330, an Application Programming Interface (API) 360, and/or applications 370. At least some of the program module 310 may be preloaded on the electronic apparatus, or may be downloaded from an external electronic apparatus (for example, the electronic apparatus 102 or 104, or the server 106).

The kernel 320 (for example, the kernel 141) may include, for example, a system resource manager 321 and/or a device driver 323. The system resource manager 321 may control, assign, or collect system resources.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 354, or an IMS manager 353.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may, for example, manage a life cycle of at least one of the applications 370. The window manager 342 may manage Graphical User Interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information required for the operation of the electronic device. According to an embodiment, the power manager 345 may control the battery to be wired or wirelessly charged and discharged.

The database manager 346 may generate, search for, and/or change a database to be used by at least one of the applications 370. The package manager 347 may manage the installation or the updating of an application distributed in the form of a package file.

The connectivity manager 348 may manage a wireless connection such as, for example, Wi-Fi or Bluetooth®. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. The IMS manager 353 may provide multimedia services, based on the Internet Protocol (IP), such as applications, audio, video, and data.

According to an embodiment, when the electronic device (for example, the electronic device 101) has a telephone call function, the middleware 330 may further include a telephony manager for managing an application or a video call function of the electronic device.

The middleware 330 may include a middleware module that forms combinations of various functions of the above described elements. The middleware 330 may provide a module specialized for each type of OS in order to provide a differentiated function. Furthermore, the middleware 330 may dynamically remove some of the existing elements, or may add new elements.

The API 360 (for example, the API 145) is, for example, a set of API programming functions, and may be provided with a different configuration according to an OS. For example, in the case of Android® or iOS®, one API set may be provided for each platform, and in the case of Tizen®, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include a preloaded application or a third party application which can be downloaded from the server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

According to various embodiments of the present disclosure, an electronic device may include: a touch screen; a processor electrically connected to the touch screen, and a memory electrically connected to the memory, wherein the memory stores instructions which, when executed by the processor, causes the processor to perform operations including: performing initial booting of the electronic device; and displaying at least one icon for the initial setup of the electronic device, and the at least one icon is movable based on a touch input detected through the touch screen.

In various embodiments, the display may display the at least one icon displayed using the presentation layer of the home screen or a separate different presentation layer.

In various embodiments, the initial setup may include at least one of an account setting, data synchronization, an authentication setting, and an application setting.

In various embodiments, the instructions may control the processor to display a detailed setting window for one of one or more icons.

In various embodiments, the instructions may control the processor to set the language of the electronic device in response to the initial booting of the electronic device, perform a use agreement procedure for the electronic device based on the language setting, and in response to the completion of the use agreement procedure, display, on the touch screen, at least one icon for the initial setup the electronic device.

In various embodiments, when the at least one icon overlaps another icon displayed on the home screen, the instructions may control the processor to automatically change the display position of the at least one icon.

In various embodiments, when the at least one icon is adjacent to another icon displayed on the home screen, the instructions may control the processor to update a display parameter of an icon corresponding to the characteristics of another icon of the one or more icons.

In various embodiments, the characteristics of another icon may include at least one of an application type and service characteristics of the application corresponding to another icon.

In various embodiments, the display parameter of the icon may include at least one of a color, shape, size, and transparency of the icon.

In various embodiments, when an input for executing the application is detected by the electronic device, the instructions may control the processor to update the display parameter of the icon, among the one or more icons, corresponding to the characteristics of the application.

In various embodiments, when a required setting of the initial setup corresponding to the at least one icon is complete, the instructions may cause the processor to activate an instruction for deleting the at least one icon.

In various embodiments, when the initial setup corresponding to the at least one icon is complete, the instructions may control the processor to update the display of the at least one icon.

In various embodiments, when the initial setup corresponding to the at least one icon is complete, the instructions may control the processor to display an icon for an additional setting.

In various embodiments, the additional setting may include a user profile setting.

In various embodiments, the electronic device may further include a communication interface, and the instructions may control the processor to transmit initial setup information corresponding to the at least one icon to other electronic device through the communication interface.

Figure 4:
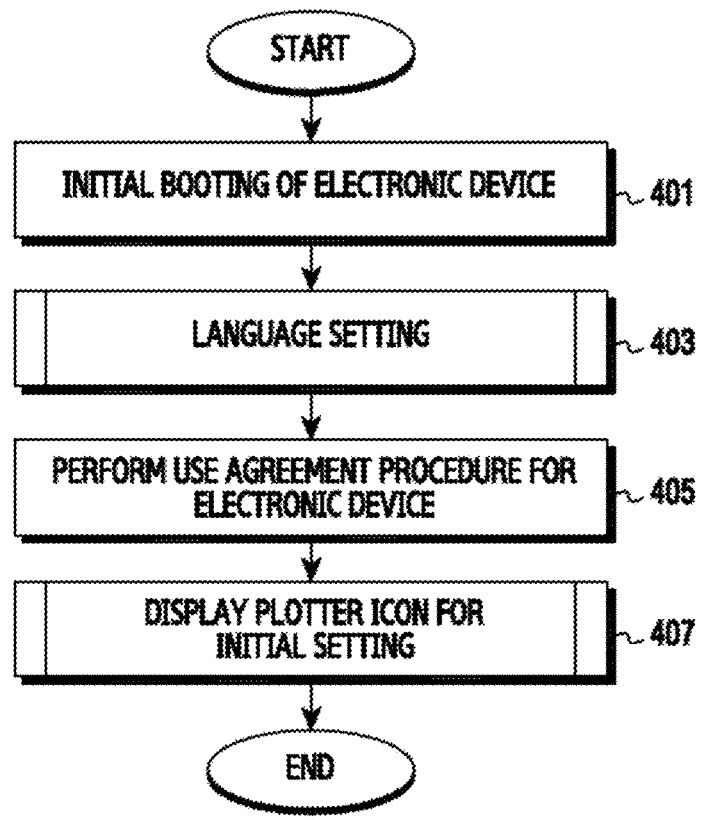
FIG. 4 is a flow chart illustrating a method of displaying a plotter icon for an initial setup on an electronic device according to various embodiments of the present disclosure.

FIG. 4 is a flow chart illustrating a flow of displaying a plotter icon for an initial setup by an electronic device according to various embodiments of the present disclosure.

Referring to FIG. 4, in operation 401, the electronic device (for example, the electronic device 101) may perform initial booting to drive the electronic device. For example, the electronic device 101 may perform initial booting by inputting a power button for the initial power supply. For example, the electronic device 101 may perform initial booting according to the progress of the initialization of the electronic device 101.

In operation 403, the electronic device may set a language to be used in the electronic device in response to the initial boot. For example, the processor 120 may control the display 160 to display language information (for example, a language list) which can be set in the electronic device 101, in response to the initial boot. The processor 120 may set a language to be used in the electronic device 101 based on the input (for example, a drag input, or a touch input) for the language information displayed on the display 160.

In operation 405, the electronic device may perform a use agreement procedure for the electronic device by using the language being used. For example, the processor 120 may control the display 160 to display End User License Agreement (EULA) setting information based on the language being used. The processor 120 may acquire the use agreement information for the electronic device based on the input information regarding the EULA setting information.

In operation 407, when the use agreement procedure for the electronic device is complete, the electronic device may display the plotter icon for an initial setup of the electronic device. For example, the processor 120 may display, on the home screen, at least one plotter icon corresponding to the initial setup of the electronic device 101. Here, the initial setup may include an account setting, data synchronization, an authentication setting (for example, fingerprint registration), and an application setting (for example, an audio setting). For example, the application setting may include a setup menu for setting default information (for example, audio information) for executing an application program.

According to various embodiments of the disclosure, when the use agreement procedure for the electronic device can be omitted, the electronic device may perform initial booting of the electronic device in operation 401, and display the plotter icon for an initial setup on at least some areas of the home screen in operation 407. That is, the electronic device may omit an operation (operation 403) for setting a language to be used in electronic device and a use agreement procedure (operation 405).

Figure 5:
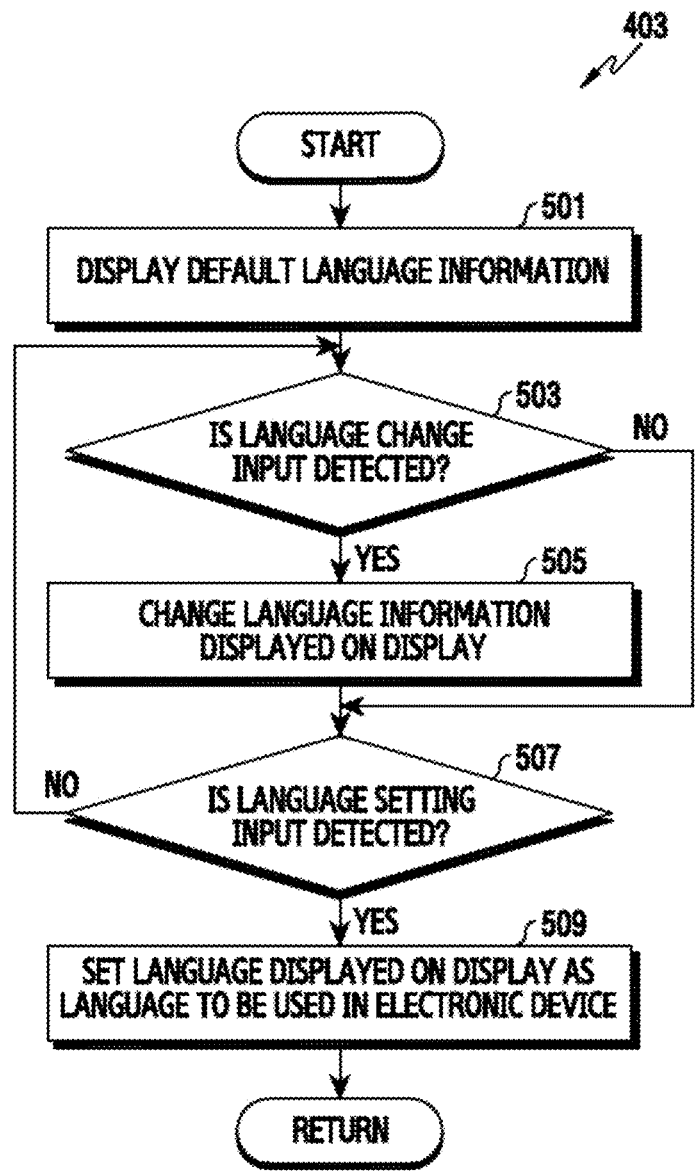
FIG. 5 is a flow chart illustrating a method of setting a language on an electronic device according to various embodiments of the present disclosure.

FIG. 5 is a flow chart illustrating a flow of setting a language by an electronic device according to various embodiments of the present disclosure. Hereinafter, an operation for setting a language in the operation 403 of FIG. 4 will be described with reference to a screen configuration illustrated in FIG. 6.

Figure 6A:
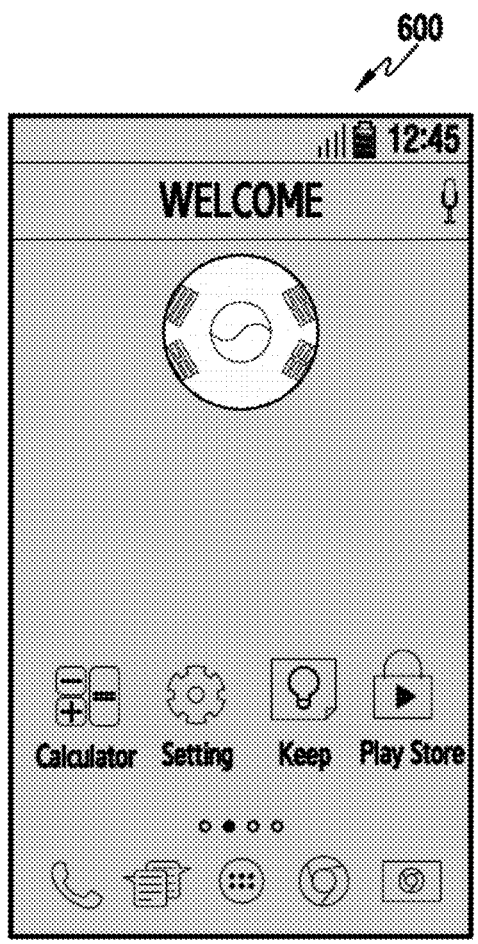
FIGS. 6A to 6E illustrate screen configurations for setting a language on an electronic device according to various embodiments of the present disclosure.

Referring to FIG. 5, when performing initial booting for the drive of the electronic device (for example, the operation 401 in FIG. 4) in operation 501, the electronic device (for example, the electronic device 101) may display default language information of the electronic device on the display (for example, the display 160). For example, as shown in FIG. 6A, the processor 120 may control such that information on "Korean" (for example, a national flag image) 600, which is set as a default language of the electronic device 101, is displayed on at least some areas of the display 160. Here, the default language may represent an initial language set in the electronic device 101.

Figure 6B:
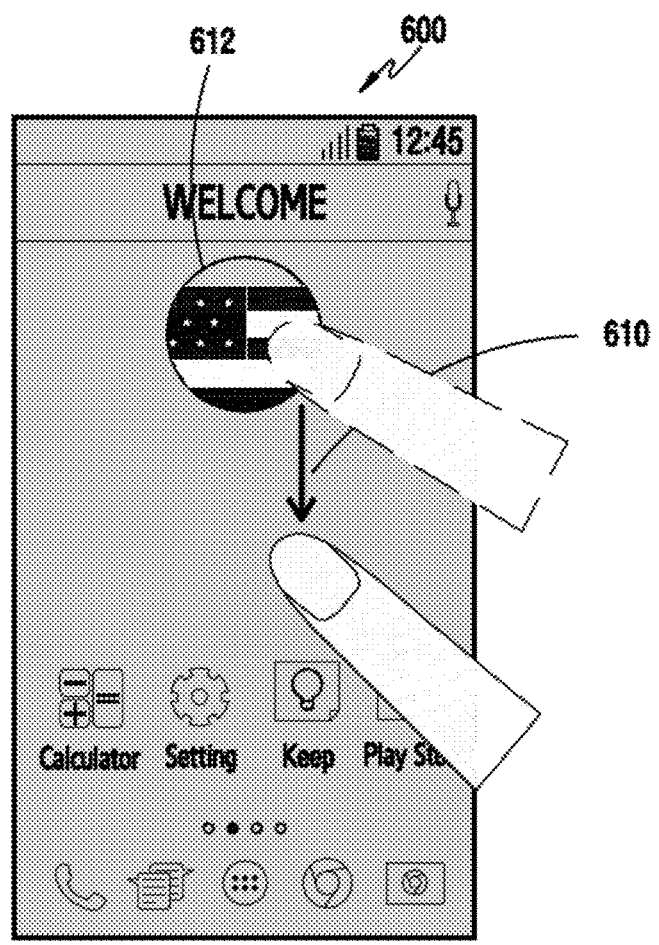

In operation 503, the electronic device may determine whether an input for language change is detected through an input/output interface (for example, the input/output interface 150). For example, as shown in FIG. 6B, the processor 120 may determine whether a drag input 610 for changing language information displayed on the display 160 is detected through the input/output interface 150.

When the input for language change is not detected, the electronic device may determine whether an input for a language setting is detected through the input/output interface (for example, the input/output interface 150), in operation 507. For example, the processor 120 may determine whether a touch input with respect to the language information displayed on the display 160 is detected.

Figure 6C:
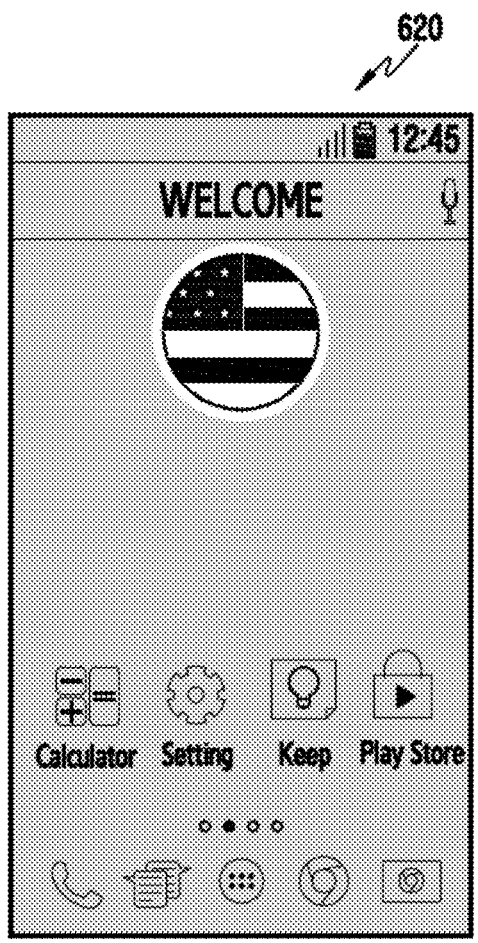

In operation 505, when the input for language change is detected, the electronic device may change the language information displayed on the display to correspond to the input for the language change. For example, as shown in FIG. 6B, the processor 120 may control the display 160 so as to correspond to the drag input 610 for the language information so that an image of the national flag of Korea corresponding to "Korean" displayed on the display 160 is changed to an image of the US flag corresponding to "English" (indicated by reference numeral 612). For example, the processor 120 may change the image of the nation displayed on the display 160 to correspond to the direction and distance of the drag input 610. Additionally, as shown in FIG. 6C, the processor 120 may control the display 160 to output a visual display 620 (for example, a glow) indicating that the language setting is enabled by using the national image (for example, the image of the US flag) displayed on the display 160.

Figure 6D:
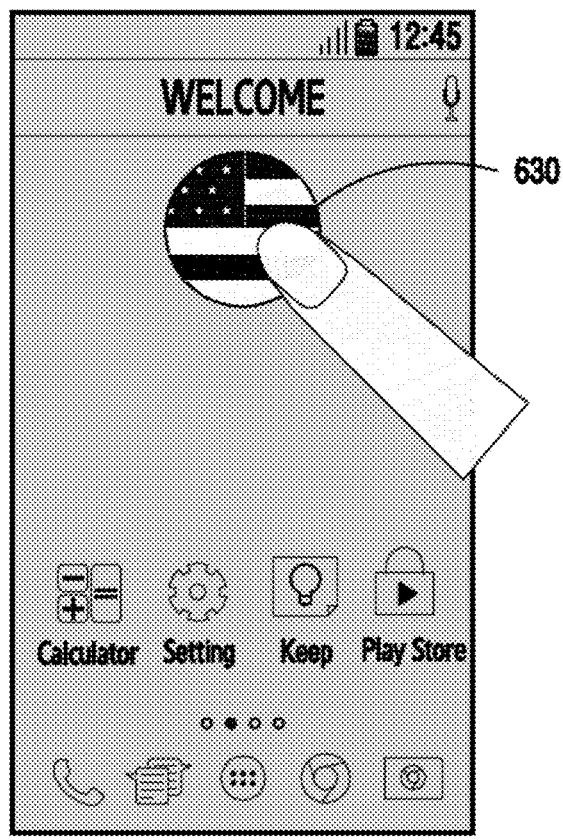

In operation 507, the electronic device may determine whether the language setting input is detected through the input/output interface. For example, as shown in FIG. 6D, the processor 120 may determine whether the touch input 630 for the language information (for example, the image of the US flag) displayed on the display 160 is detected.

When the input for the language setting is not detected, the electronic device may determine whether an input for language change is detected through the input/output interface, in operation 503.

In operation 509, when the electronic device detects an input for a language setting, a language corresponding to the language information displayed on the display may be set as a language to be used in the electronic device. For example, as shown in FIG. 6D, when a touch input 630 for the image of the US flag displayed in the display 160 is detected, the processor 120 may set "English" corresponding to the image of the US flag as a language to be used in the electronic device 101.

Figure 6E:

According to an embodiment, in response to the setting of the language to be used, as shown in FIG. 6E, the electronic device (for example, the electronic device 101) may display, on the display, a description for the use agreement procedure for the electronic device (for example, EULA setting information) 640, based on the language being used (operation 405 in FIG. 4). When the electronic device detects an input regarding an approval button (I agree) included in the description for the use agreement procedure, it is determined that the use agreement procedure for the electronic device has been completed.

Figure 7:
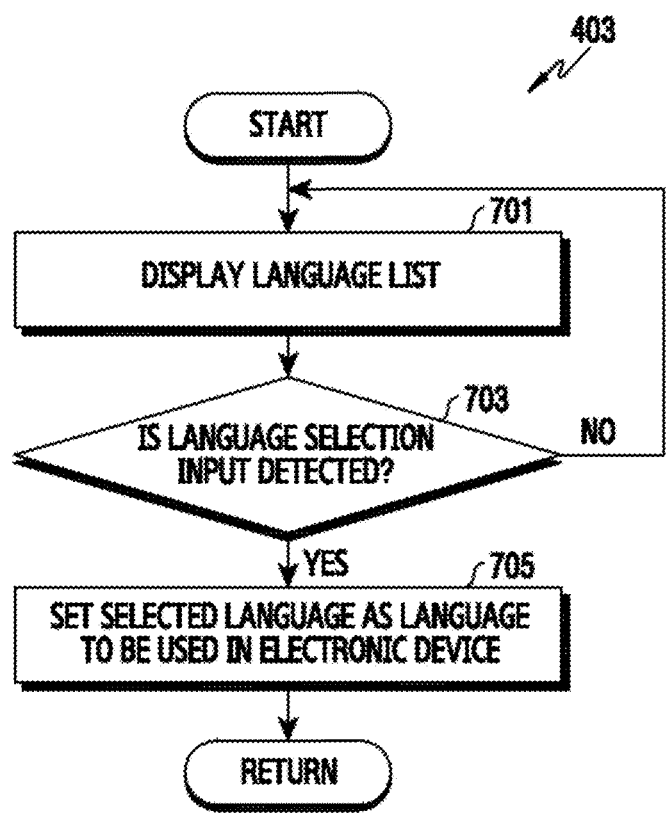
FIG. 7 is a flow chart illustrating a method of setting a language to be used on an electronic device, including setting the language using a language list according to various embodiments of the present disclosure.

FIG. 7 is a flow chart illustrating a flow of setting a language to be used using a language list by an electronic device according to various embodiments of the present disclosure. Hereinafter, an operation for setting a language in the operation 403 of FIG. 4 will be described.

Referring to FIG. 7, when performing initial booting for the drive of the electronic device (for example, the operation 401 in FIG. 4) in operation 701, the electronic device (for example, the electronic device 101) may display, on the display (for example, the display 160), a language list including languages which can be installed in the electronic device, in response to the initial booting of the electronic device.

In operation 703, the electronic device may determine whether the language selection input is detected through the input/output interface. For example, the processor 120 may determine whether a touch input for a particular language of the language list displayed on the display 160 is detected.

In operation 705, when the electronic device detects an input for a language setting, a language which is selected by the input for the language setting from a language list displayed on the display may be set as a language to be used in the electronic device. For example, when the touch input on "English" is detected from the language list displayed on the display 160, the processor 120 may set English as a language to be used in the electronic device 101.

Figure 8:
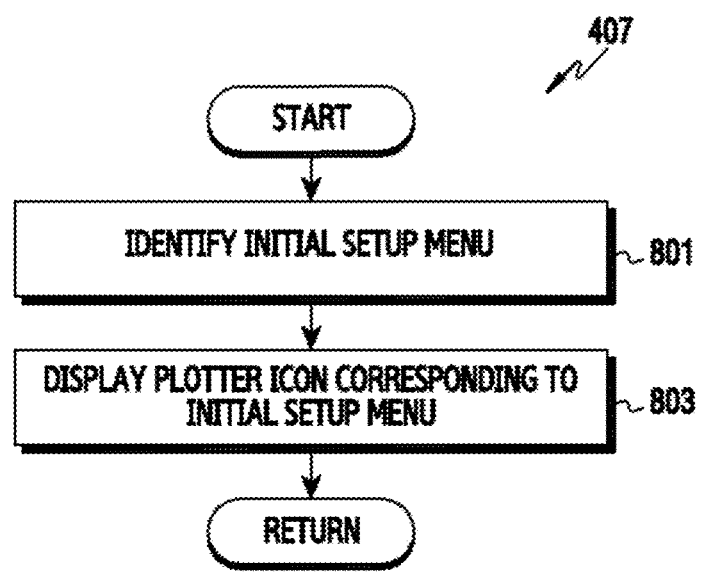
FIG. 8 is a flow chart illustrating a method of displaying a plotter icon corresponding to an initial setup menu on an electronic device according to various embodiments of the present disclosure.

FIG. 8 is a flow chart illustrating a flow of displaying a plotter icon corresponding to an initial setup menu by an electronic device according to various embodiments of the present disclosure. Hereinafter, an operation for displaying the plotter icon for the initial setup in the operation 407 of FIG. 4 will be described using a screen configuration illustrated in FIG. 10.

Referring to FIG. 8, in operation 801, when the use agreement procedure of the electronic device (for example, the operation 405 of FIG. 4) is complete, the electronic device (for example, electronic device 101) may identify the initial setup menu of the electronic device. For example, the processor 120 may identify the initial setup menu such as an account setting, data synchronization, an authentication setting, and an application setting to perform the initial setup to the plotter icon.

Figure 10A:
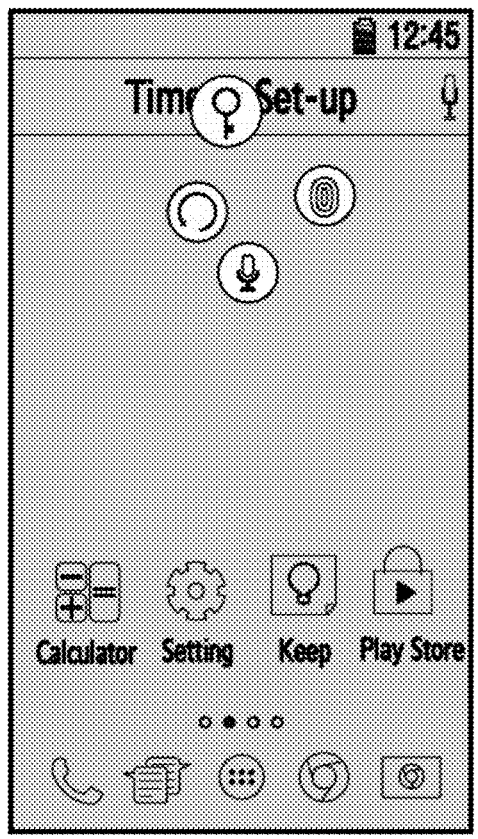
FIGS. 10A to 10H illustrate screen configurations for displaying a plotter icon for an initial setup on an electronic device according to various embodiments of the present disclosure.
Figure 10B:
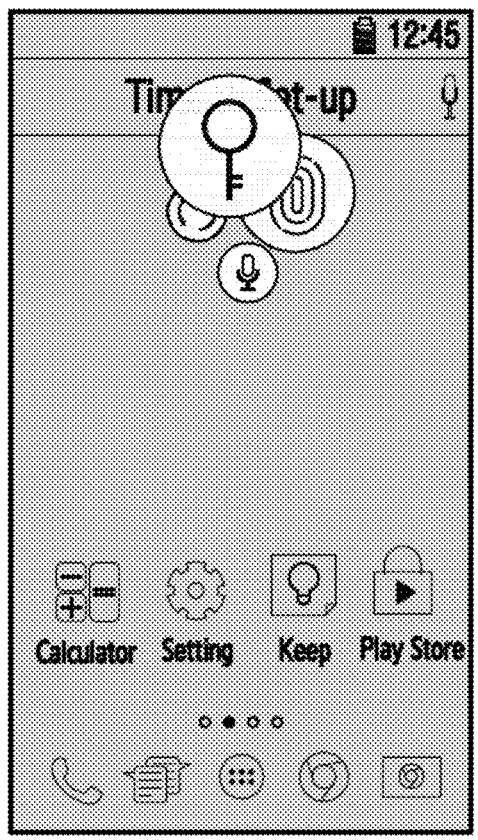
Figure 10C:
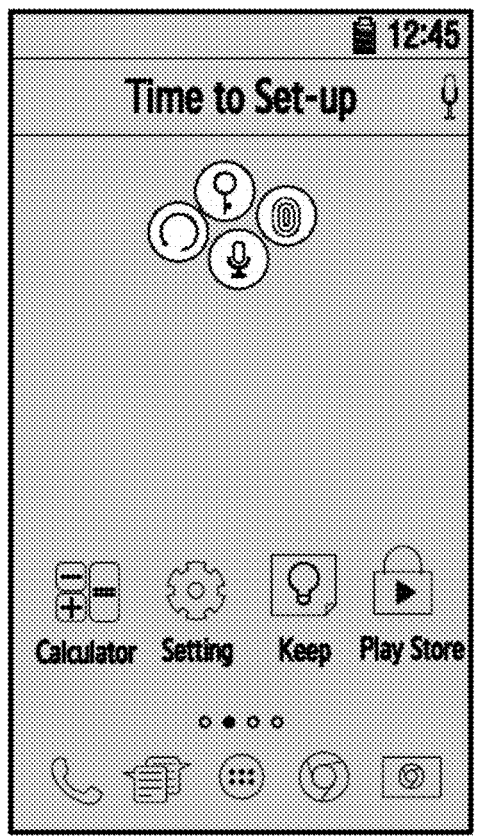
Figure 10D:
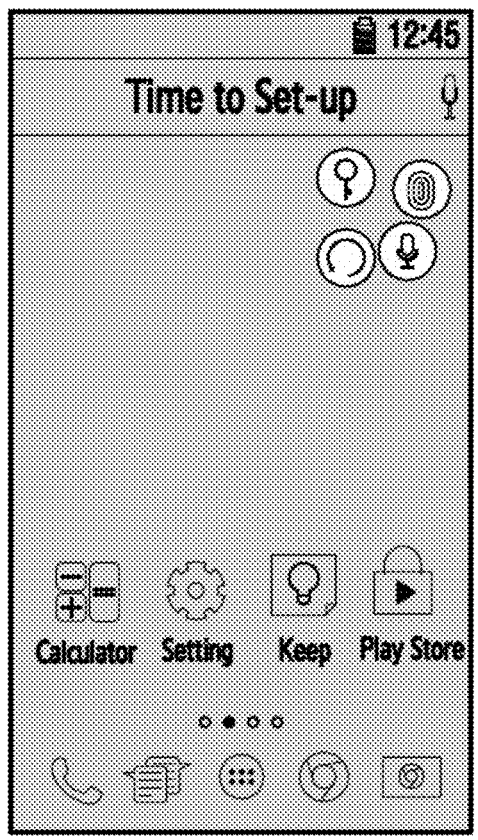
Figure 10E:
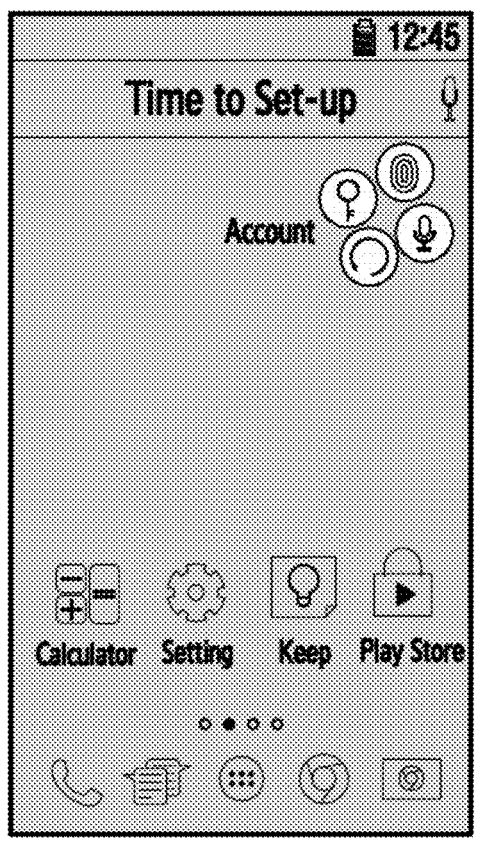

In operation 803, the electronic device may display, on the display, at least one plotter icon corresponding to the initial setup menu. For example, as shown in FIGS. 10A to 10D, the processor 120 may control the display 160 to output visual effects of regularly or randomly moving such that each plotter icon corresponding to the initial setup menu is floating in the air or water. The processor 120 may control the display such that the movement amount of the plotter icon displayed on the display 160 is reduced. As shown in FIG. 10E, the processor 120 may control the display 160 such that at least one plotter icon corresponding to the initial setup menu is displayed as a single set on a part of the home screen. In addition, the processor 120 may control the display 160 to display at least one of a control menu icon, an application icon, or a quick menu icon on another area of the home screen.

Figure 9:
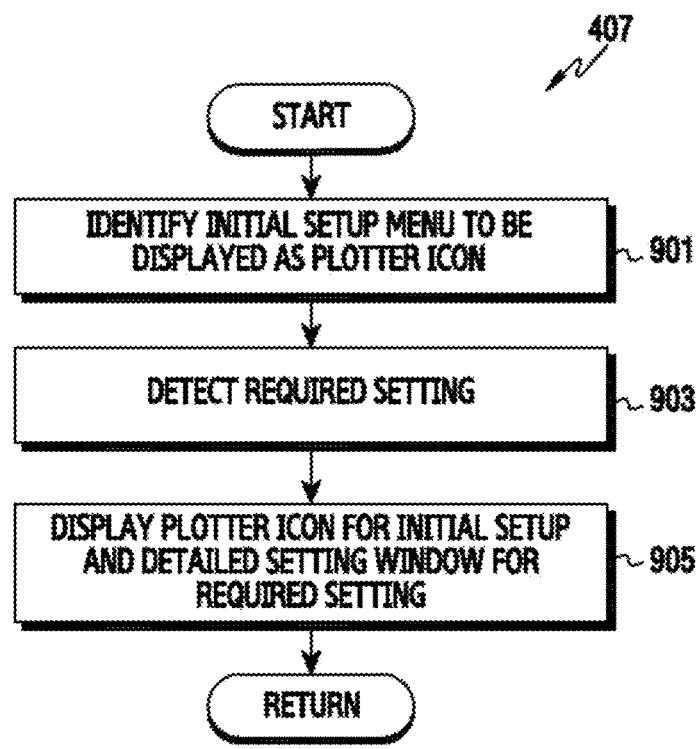
FIG. 9 is a flow chart illustrating a method of displaying a detailed setting window for a required setting on an electronic device according to various embodiments of the present disclosure.

FIG. 9 is a flow chart illustrating a flow of displaying a detailed setting window for a required setting by an electronic device according to various embodiments of the present disclosure. Hereinafter, an operation for displaying the plotter icon for the initial setup in the operation 407 of FIG. 4 will be described using a screen configuration illustrated in FIG. 10.

Referring to FIG. 9, in operation 901, when the use agreement procedure for the electronic device (for example, the operation 405 of FIG. 4) is complete, the electronic device (for example, electronic device 101) may identify the initial setup menu to be displayed by the plotter icon. For example, the initial setup menu may include an account setting, data synchronization, an authentication setting, an application setting, and so on.

In operation 903, the electronic device may detect the required setup menu of the initial setup menu. For example, the processor 120 may select a predefined at least one menu (for example, the account setting) necessary for the drive of the electronic device 101, from among the initial setup menu of the electronic device 101. For example, the required setup menu may be set by the manufacturer of the electronic device 101.

Figure 10F:
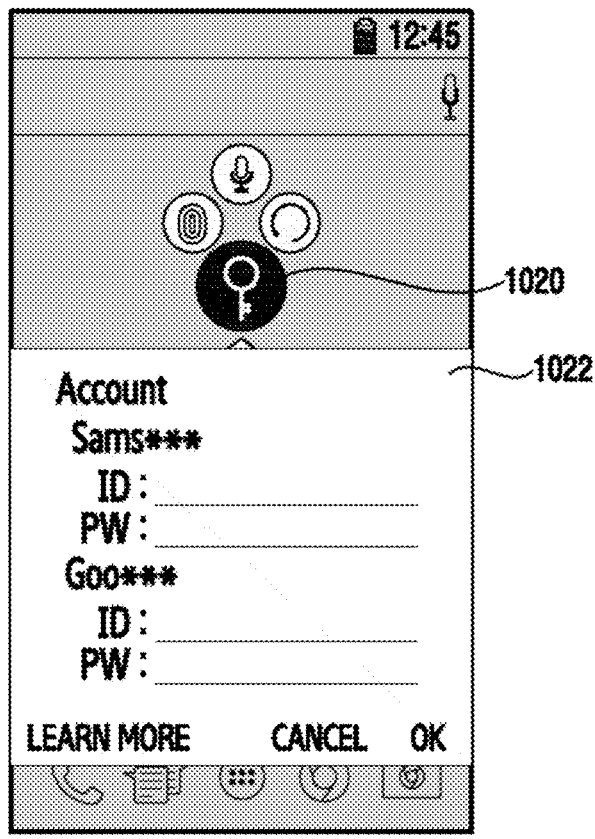
Figure 10G:
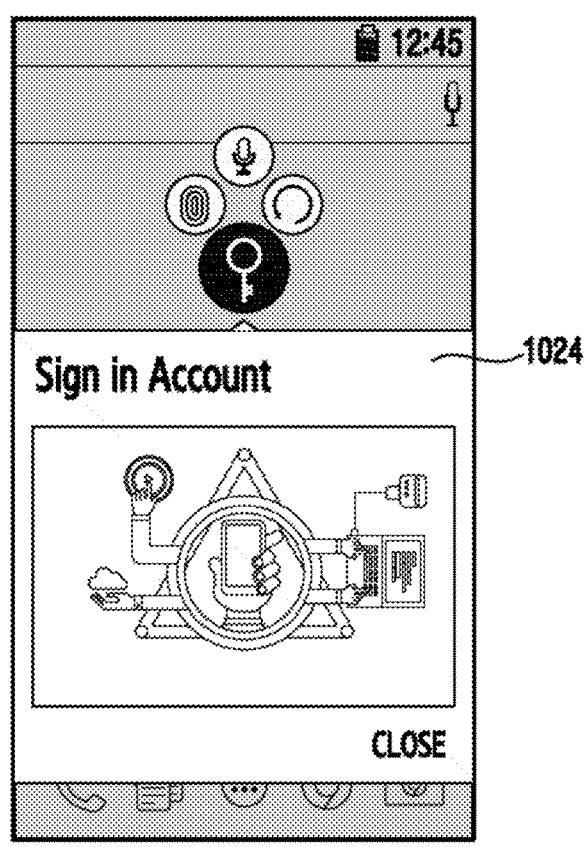

In operation 905, the electronic device may display, on the display, at least one plotter icon for the initial setup and a detailed setting window for the required setup menu. For example, as shown in FIGS. 10A to 10E, the processor 120 may control such that at least one plotter icon moving based on the visual effects of floating in the air or water is displayed as a single set on a part of the display 160. As shown in FIG. 10F, the processor 120 may control the display 160 to display a detailed setting window 1022 of the plotter icon 1020 (for example, account setting) corresponding to the required setup menu among the plotter icons displayed on a part of the display 160. In addition, when left or right drag inputs to a detailed setup window 1022 for the required setup menu are detected, as shown in FIG. 10G, the processor 120 may control the display 160 to display the description 1024 corresponding to the required setup menu. When an input for a description button (learn more) of a detailed setup window 1022 for the required setup menu are detected, as shown in FIG. 10G, the processor 120 may control the display 160 to display the description 1024 corresponding to the required setup menu. Here, the description 1024 may include a service corresponding to the required setup menu or a setting method of the required setup menu.

Figure 10H:
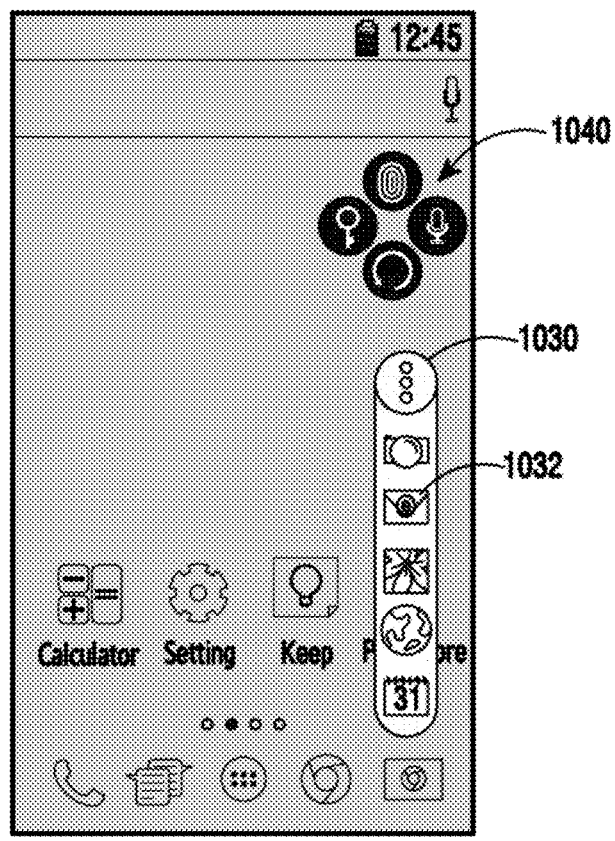

According to an embodiment, as shown in FIG. 10H, when other icons shown on the home screen (for example, the quick menu icons 1030) are executed (indicated by reference numeral 1032), the electronic device (for example, the electronic device 101) may display the plotter icons in a deactivated state (indicated by reference numeral 1040).

Figure 11:
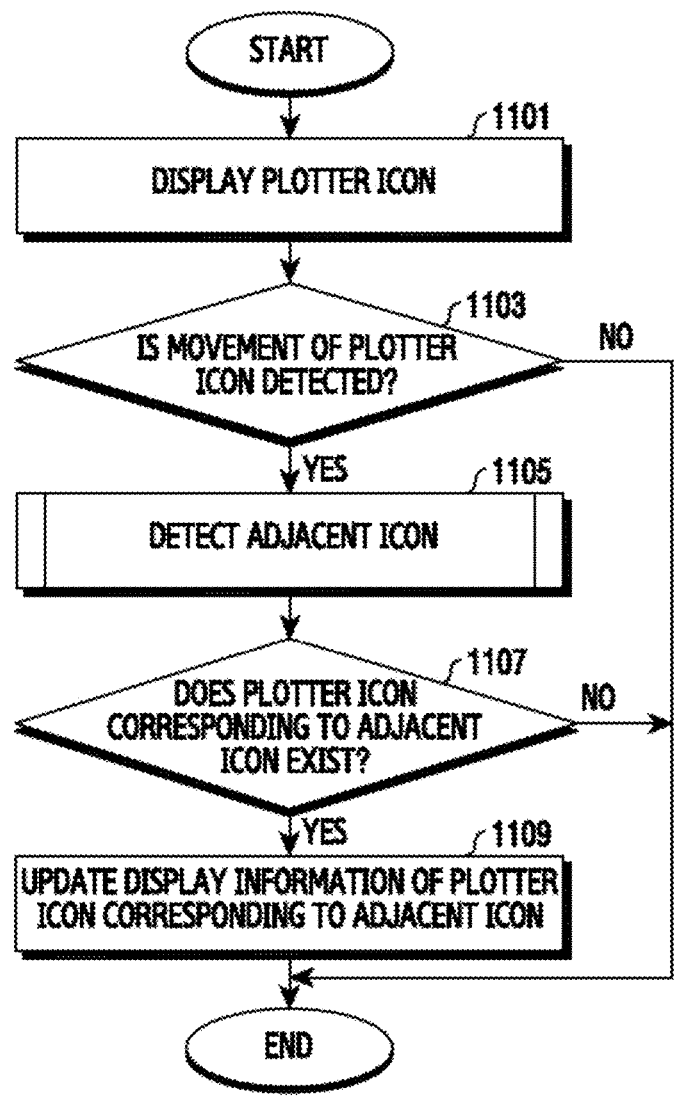
FIG. 11 is a flow chart illustrating a method of displaying information associated with an application through a plotter icon by an electronic device according to various embodiments of the present disclosure.

FIG. 11 is a flow chart illustrating a flow of displaying information associated with an application through a plotter icon by an electronic device according to various embodiments of the present disclosure. Hereinafter, an operation for displaying the information associated with the application will be described using the screen configuration shown in FIG. 12.

Figure 12A:
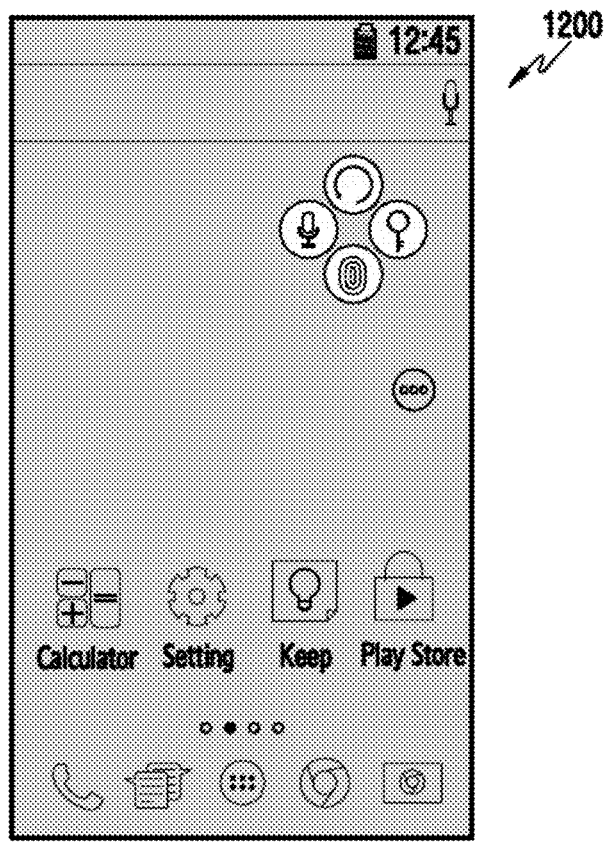
FIGS. 12A to 12D illustrate screen configurations for displaying information associated with an application through a plotter icon on an electronic device according to various embodiments of the present disclosure.

Referring to FIG. 11, in operation 1101, the electronic device (for example, the electronic device 101) may display at least one plotter icon for the initial setup on a part of the display. For example, as shown in FIG. 12A, the processor 120 may control the display 160 to display the plotter icon for an account setting, data synchronization, an authentication setting, and an application setting as a single set (indicated by reference numeral 1200). In addition, the display 160 may display one or more other icons on a remaining area other than the area where the plotter icon is displayed on the home screen. Here, the other icons may include at least one of an application icon, a control menu icon, a widget, or a quick menu icon.

In operation 1103, the electronic device may determine whether the movement of the plotter icon is detected. For example, the processor 120 may determine whether a drag input to the plotter icon is detected through the input/output interface 150. For example, the processor 120 may determine whether the movement of the electronic device 101 corresponding to the movement of the plotter icon is detected.

Figure 12B:
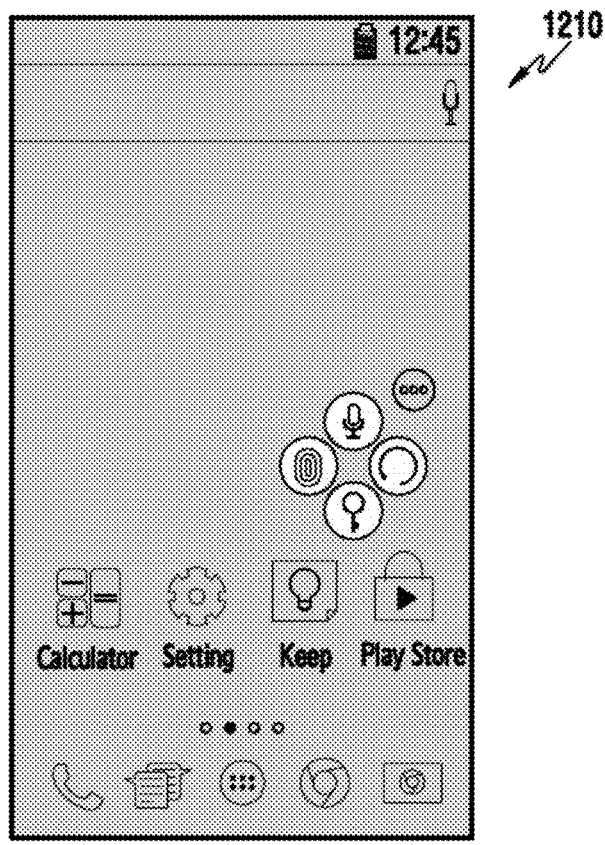

In operation 1105, the electronic device may detect an adjacent icon corresponding to the plotter icon based on the movement of the plotter icon. For example, as shown in FIG. 12B, the processor 120 may change the positions of the plotter icons to correspond to the drag input of the plotter icon (indicated by reference numeral 1210). The processor 120 may detect an adjacent icon (e.g., an application icon), which is located within the reference distance to the plotter icon, based on the position change of the plotter icons.

In operation 1107, the electronic device may determine whether there is a plotter icon corresponding to the characteristics of the adjacent icon. For example, the processor 120 may determine whether the type of application corresponding to the adjacent icon or the initial setup menu corresponding to service characteristics of the application exists in the initial setup menu corresponding to the plotter icon.

Figure 12C:
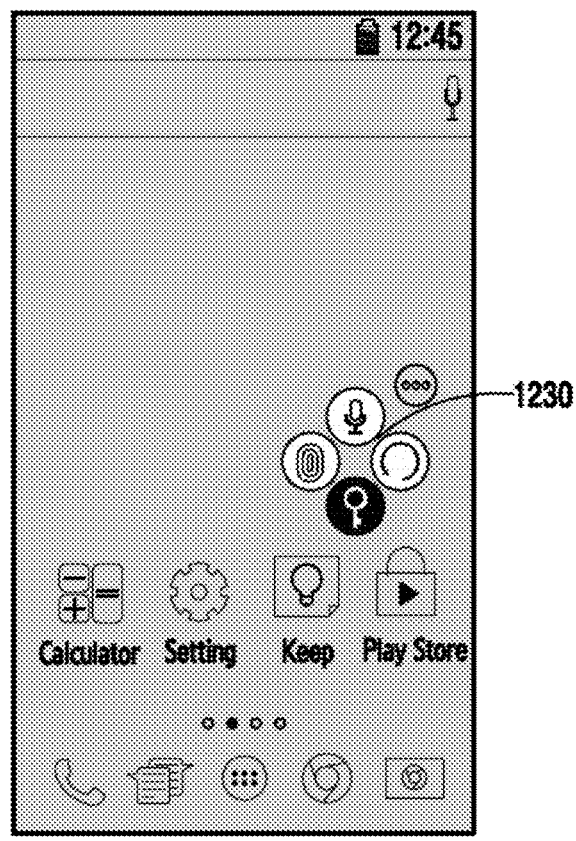

In operation 1109, when there is a plotter icon corresponding to the characteristics of the adjacent icon, the electronic device may update the display information of the corresponding plotter icon. For example, as shown in FIG. 12C, the processor 120 may update the display parameter of the corresponding plotter icon 1230 such that the plotter icon corresponding to the characteristics of the adjacent icon is distinguished from other plotter icons. Here, the display parameter may include at least one of a color, shape, size, and transparency of the plotter icon.

According to various embodiments of the present disclosure, when the electronic device detects a plurality of adjacent icons, the display parameter of the one or more plotter icons corresponding to adjacent icons can be updated.

Figure 12D:
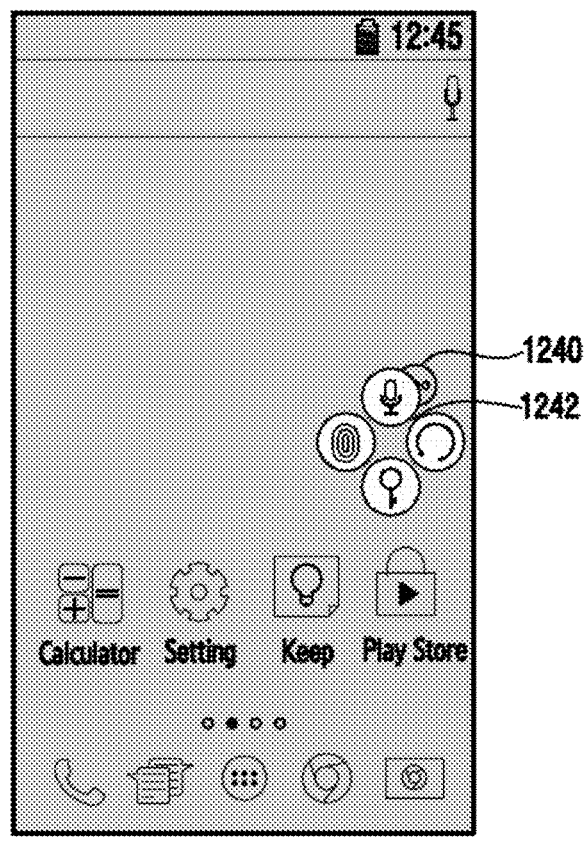

According to various embodiments of the present disclosure, the electronic device may display the plotter icon such that the plotter icon displayed on the display is not overlapped with the other icons (for example, an application icon, a control menu icon, and a quick menu icon). For example, as shown in FIG. 12D, when the plotter icon 1242 overlaps another icon 1240 (e.g., the quick menu icon), the processor 120 may automatically update the position of the plotter icon 1242 so as not to overlap with another icon 1240, based on the drag input. For example, the processor 120 may automatically update the position of the plotter icon 1242 based on at least one of an overlapping range between a plotter icon 1242 and another icon 1240 and a display area of remaining other icons. For example, when the plotter icon 1242 overlaps another icon 1240, the processor 120 may update the position of the plotter icon 1242 in a random direction and distance.

Figure 13:
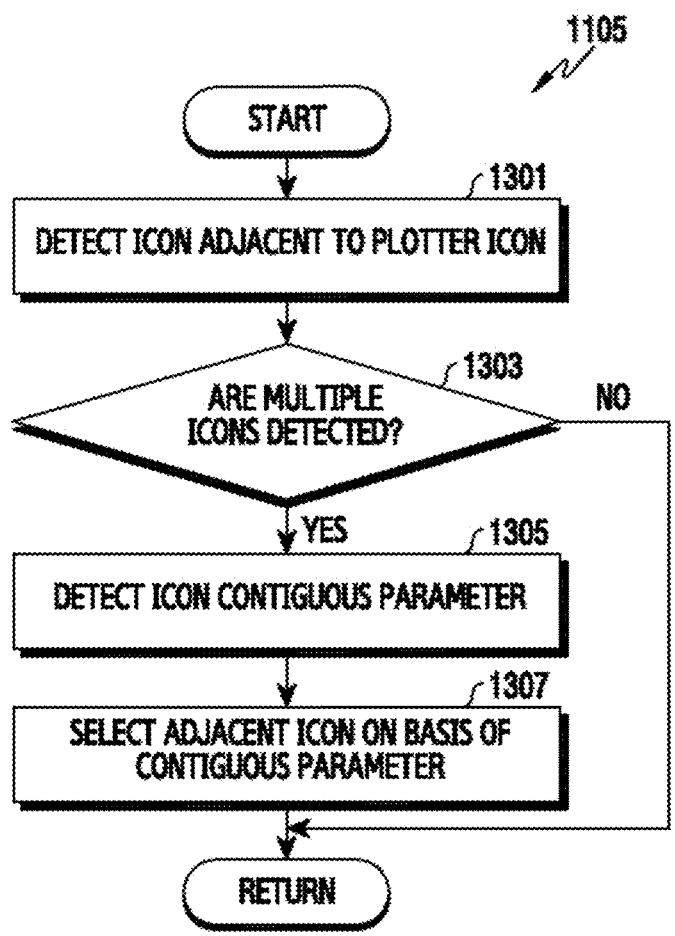
FIG. 13 is a flow chart illustrating a method of selecting an icon adjacent to a plotter icon on an electronic device according to various embodiments of the present disclosure.

FIG. 13 is a flow chart illustrating a flow of selecting an icon adjacent to a plotter icon by an electronic device according to various embodiments of the present disclosure. Hereinafter, an operation for detecting an adjacent icon in the operation 1105 of FIG. 11 will be described.

Referring to FIG. 13, in operation 1301, when the movement of the plotter icon is detected, the electronic device (for example, the electronic device 101) may detect at least one icon adjacent to the plotter icon based on the movement of the icon (for example, operation 1103 of FIG. 11). For example, the processor 120 may detect at least one application icon located within the reference distance from the display area of the plotter icon.

In operation 1303, the electronic device may determine whether a plurality of icons are adjacent to the plotter icon. For example, the processor 120 may determine whether there are plurality of icons, the display area of which is adjacent to or overlapped with the display area of the plotter icon.

When one icon is adjacent to the plotter icon, the electronic device may determine that the corresponding icon is an adjacent icon corresponding to the plotter icon.

In operation 1305, the electronic device may detect a contiguous parameter for each of a plurality of icons adjacent to the plotter icon. For example, the processor 120 may detect the contiguous parameter of at least one of a distance of each icon, overlapping or not, or an overlapping range with respect to the plotter icon. Here, the overlap between the plotter icon and the adjacent icon may include a state where the input for the movement of the plotter icon is held while the movement of the plotter icon is held so that the display area between another icon and the plotter icon overlaps each other.

In operation 1307, the electronic device may select one adjacent icon by comparing the contiguous parameters of multiple icons adjacent to the plotter icon. For example, the processor 120 may select an icon, which has the lower or minimum distance to the plotter icon, as an adjacent icon. For example, the processor 120 may select an icon, which has a display area overlapped with the display area of the plotter icon, as an adjacent icon. For example, when multiple icons overlap with the display area of the plotter icon, the processor 120 may select an icon, which has a maximum or upper range overlapping with the plotter icon, as an adjacent icon.

Figure 14:
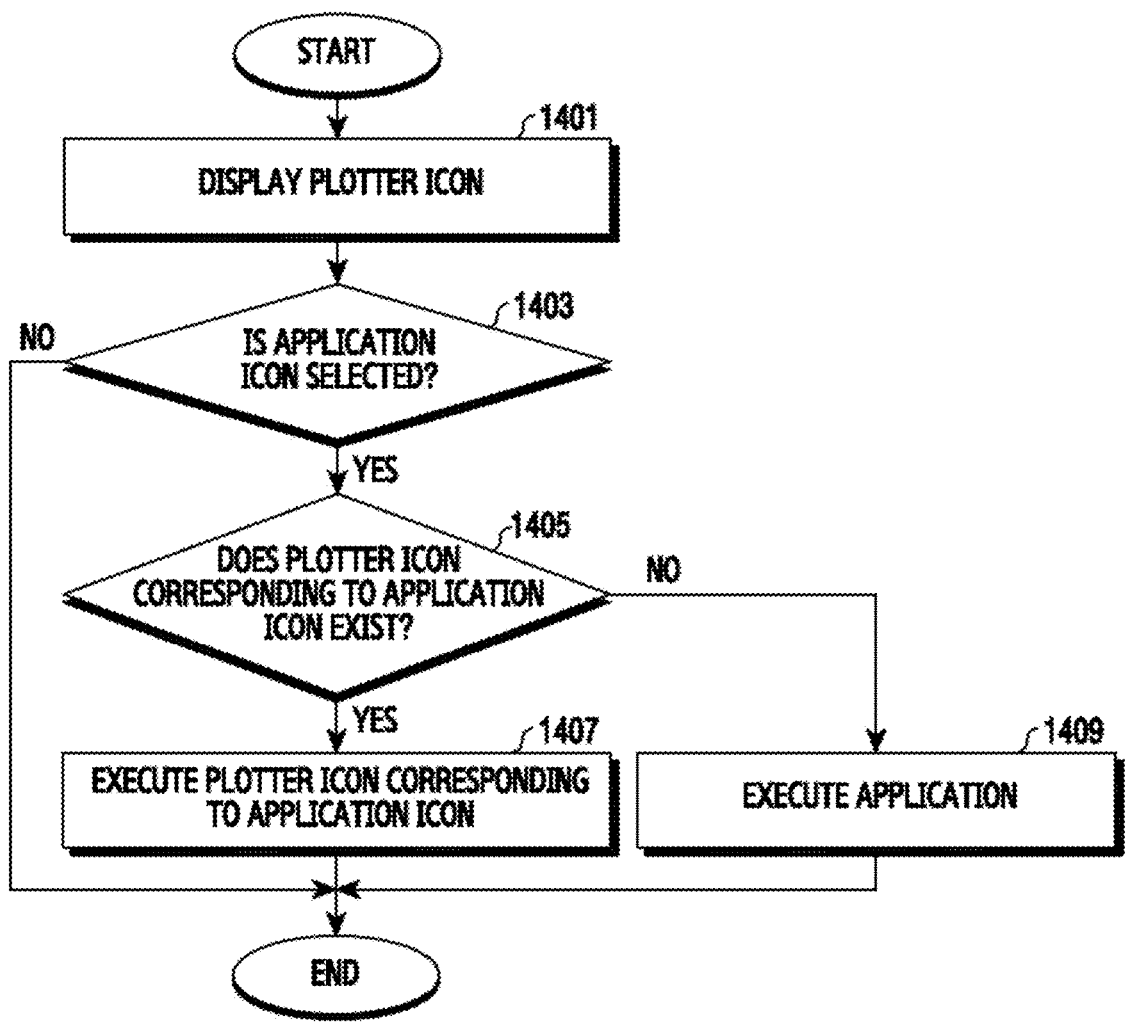
FIG. 14 is a flow chart illustrating a method of executing a plotter icon corresponding to an application on an electronic device according to various embodiments of the present disclosure.

FIG. 14 is a flow chart illustrating a flow of executing a plotter icon corresponding to an application by an electronic device according to various embodiments of the present disclosure. Hereinafter, an operation for executing the plotter icon corresponding to the application will be described using the screen configuration shown in FIG. 16.

Figure 16A:
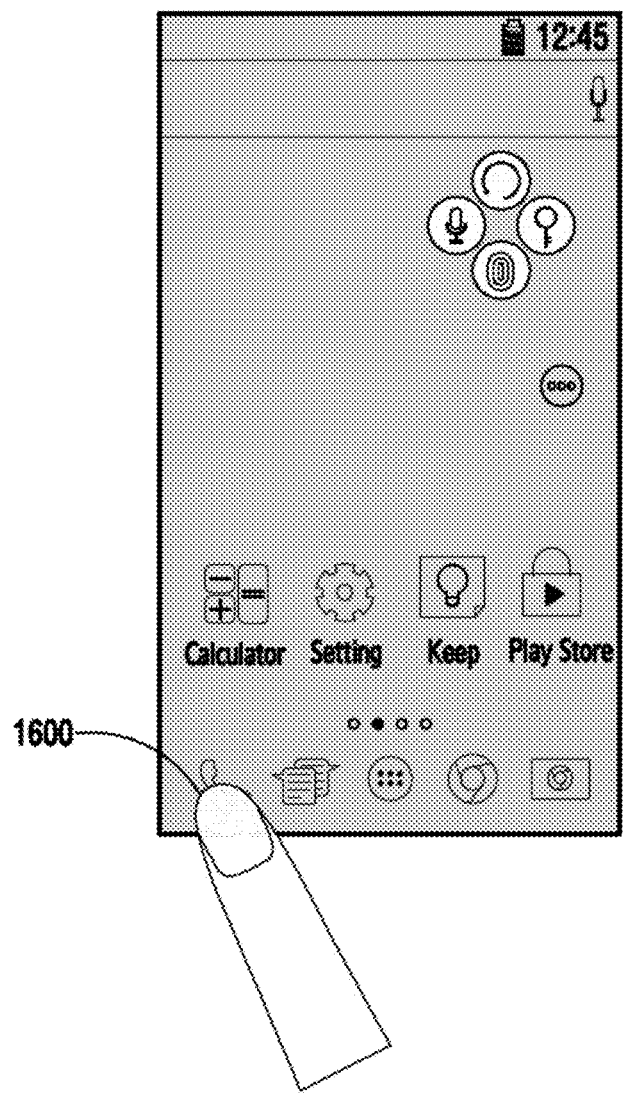
FIGS. 16A to 16D illustrate screen configurations for displaying plotter icon information corresponding to an application on an electronic device according to various embodiments of the present disclosure.

Referring to FIG. 14, in operation 1401, the electronic device (for example, the electronic device 101) may display at least one plotter icon for the initial setup on at least some areas of the display. For example, as shown in FIG. 16A, the processor 120 may control the display 160 such that at least one plotter icon corresponding to the initial setup menu of the electronic device 101 is displayed as a single set on at least some areas of the home screen. In addition, the processor 120 may control the display 160 to display at least one of a control menu icon, an application icon, or a quick menu icon on the other area of the home screen.

In operation 1403, the electronic device may determine whether an input for selecting an application icon displayed on the home screen is detected through the input/output interface. For example, as shown in FIG. 16A, the processor 120 may determine whether a touch input 1600 corresponding to a "telephone" icon among the plurality of application icons displayed on the home screen is detected.

In operation 1405, when the input for selecting the application icon is detected, the electronic device may determine whether the plotter icon corresponding to the application icon exists. For example, the processor 120 may identify a telephone application (contact application) corresponding to the "telephone" icon selected by the touch input 1600 in FIG. 16A. The processor 120 may determine whether there is an initial setup menu in which the initial setup associated with the telephone application is not complete, from among the initial setup menu corresponding to the plotter icon.

Figure 16B:
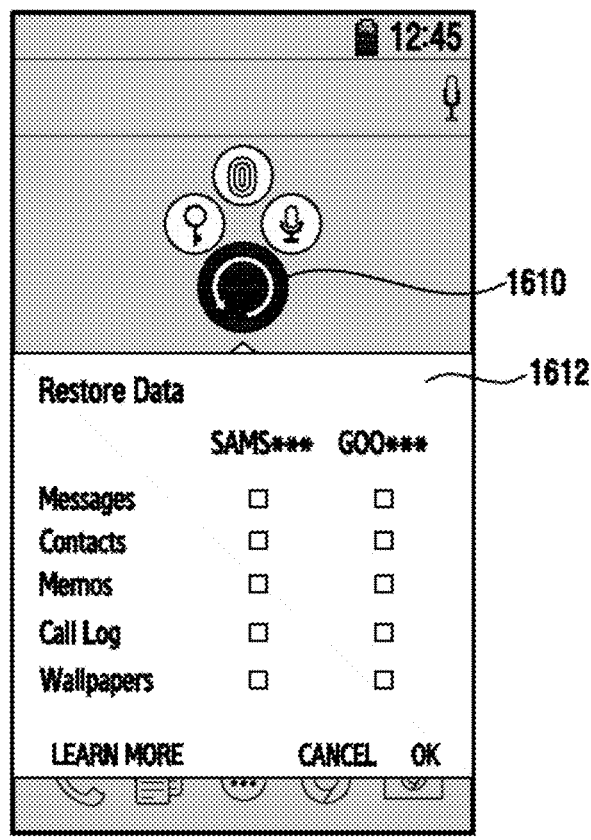
Figure 16C:
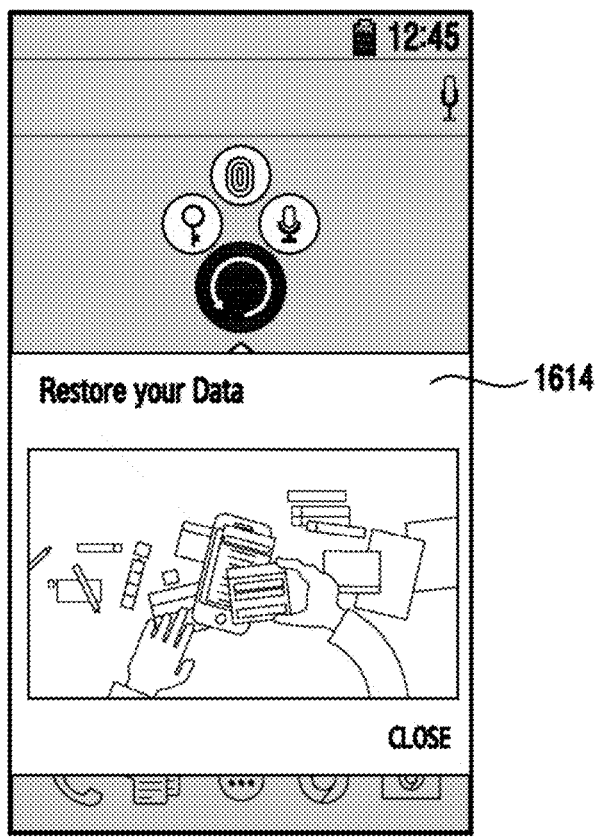
Figure 16D:
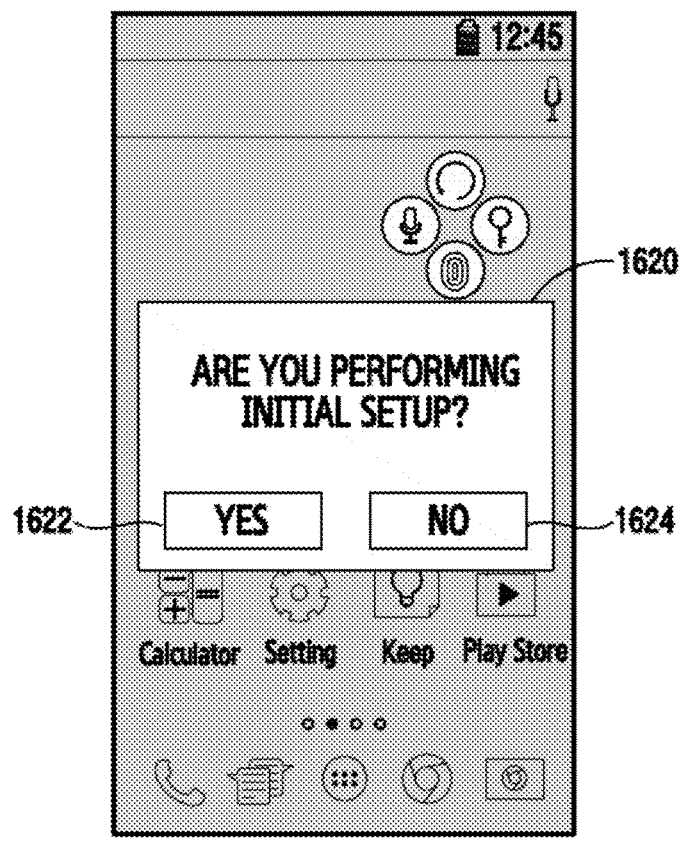

In operation 1407, when the plotter icon corresponding to the application icon is present, the electronic device may perform the initial setup of the plotter icon corresponding to the application icon. For example, when a data synchronization menu associated with the telephone application among the initial setup menu corresponding to the plotter icon is present, as shown in FIG. 16B, the processor 120 may control the display 160 to display the detailed setting window 1612 of the plotter icon 1610 corresponding to the data synchronization menu. In addition, when left or right drag inputs to a detailed setup window 1612 for the data synchronization are detected, as shown in FIG. 16C, the processor 120 may control the display 160 to display the description 1614 corresponding to the data synchronization.

In operation 1409, when the plotter icon corresponding to the application icon is not present, the electronic device may perform an application corresponding to the application icon. For example, when the initial setup associated with the telephone application does not exist among the initial setup menu corresponding to the plotter icon, the processor 120 may control the display 160 to display an execution screen of the telephone application.

Figure 15:
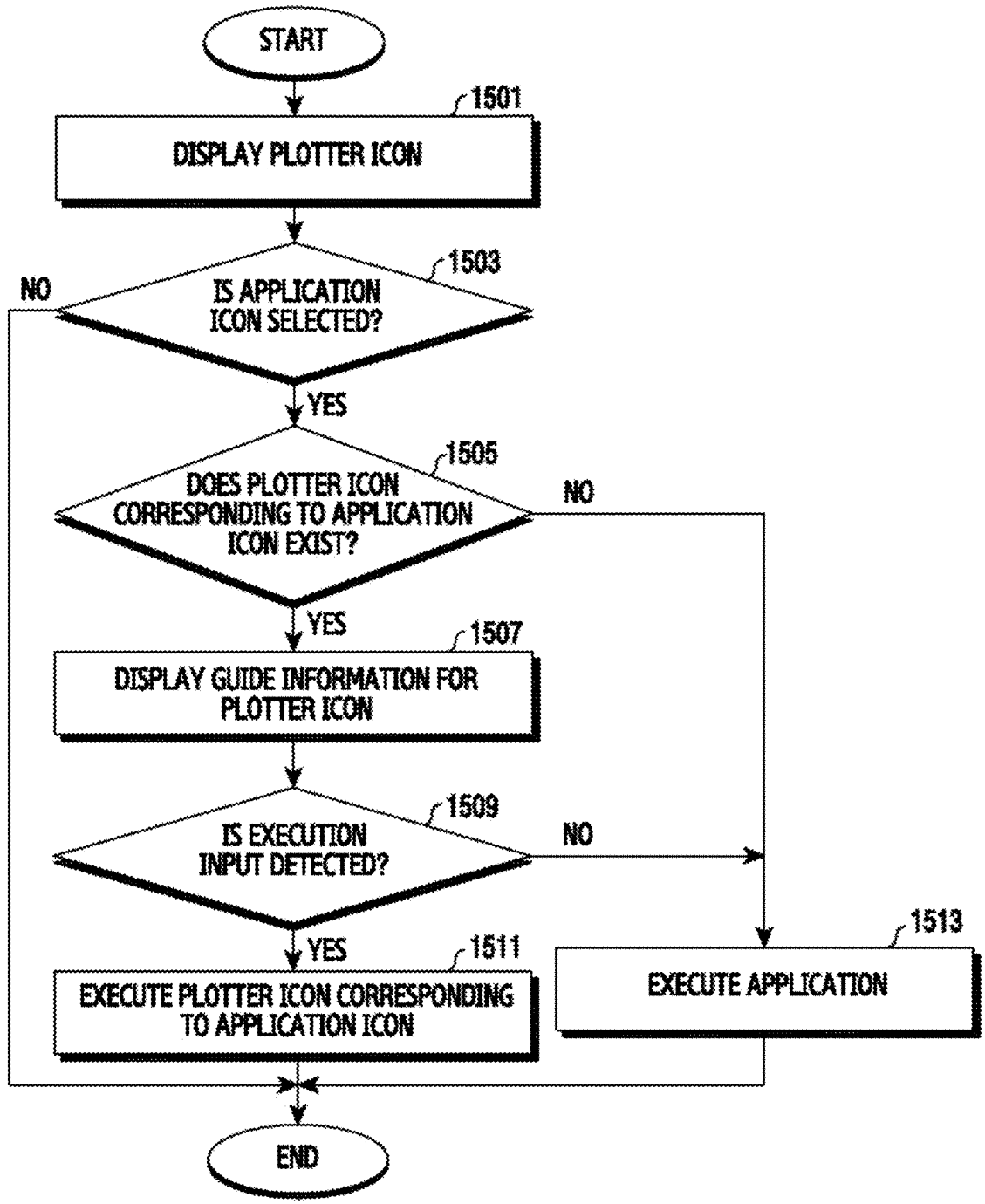
FIG. 15 is a flow chart illustrating a method of displaying plotter icon information corresponding to an application on an electronic device according to various embodiments of the present disclosure.

FIG. 15 is a flow chart illustrating a flow of displaying a plotter icon corresponding to an application by an electronic device according to various embodiments of the present disclosure. Hereinafter, an operation for displaying the plotter icon corresponding to the application will be described using the screen configuration shown in FIG. 16.

Referring to FIG. 15, in operation 1501, the electronic device (for example, the electronic device 101) may display at least one plotter icon for the initial setup on at least some areas of the display. For example, as shown in FIG. 16A, the processor 120 may control the display 160 such that at least one plotter icon corresponding to the initial setup menu of the electronic device 101 is displayed as a single set on at least some areas of the home screen. In addition, the display 160 may display at least one of an application icon, a control menu icon, or a quick menu icon on the other area of the home screen.

In operation 1503, the electronic device may determine whether an input for selecting an application icon displayed on the home screen is detected. For example, as shown in FIG. 16A, the processor 120 may determine whether a selection input 1600 corresponding to a "telephone" icon among the plurality of application icons displayed on the home screen is detected. For example, the processor 120 may determine whether the selection input 1600 corresponding to the "telephone" icon is detected using the input/output interface 150 or a sensor module.

In operation 1505, when the input for selecting the application icon is detected, the electronic device may determine whether the plotter icon of the initial setup menu associated with the application icon exists. For example, when the "telephone" icon is selected by the touch input 1600 in FIG. 16A, the processor 120 may determine whether the initial setup menu associated with the telephone application of the "telephone" icon is present.

When there is no plotter icon of the initial setup menu in which the initial setup associated with the application of the application icon is not complete, the electronic device may execute the application corresponding to the application icon, in operation 1513.

In operation 1507, when there is a plotter icon of the initial setup menu in which the initial setup associated with the application of the application icon is not complete, the electronic device may display guidance information on the corresponding plotter icon on the display. For example, when a data synchronization menu associated with the telephone application among the initial setup menu corresponding to the plotter icon exists, as shown in FIG. 16B, the processor 120 may control the display 160 to display a message prompts 1620 of the data synchronization menu.

In operation 1509, the electronic device may determine whether an input for executing the initial setup menu corresponding to the plotter icon is detected. For example, as shown in FIG. 16B, the processor 120 may determine whether a touch input on the "Yes" menu 1622 for the message prompt 1620 of the data synchronization menu is detected through the input/output interface 150.

In operation 1511, when the input for executing the initial setup menu corresponding to the plotter icon is detected, the electronic device may perform the initial setup of the plotter icon corresponding to the application icon. For example, when a touch input on the "Yes" menu 1622 for the message prompt 1620 of the data synchronization menu is detected, as shown in FIG. 16B, the processor 120 may control the display 160 to display a detailed setting window 1612 of the plotter icon 1610 corresponding to the data synchronization menu.

In operation 1513, when the input for terminating the initial setup menu corresponding to the plotter icon is detected, the electronic device may execute the application corresponding to the application icon. For example, when a touch input on the "No" menu 1624 with respect to the message prompts 1620 of the data synchronization menu is detected, the processor 120 may control the display 160 to display an execution screen of the telephone application.

Figure 17:
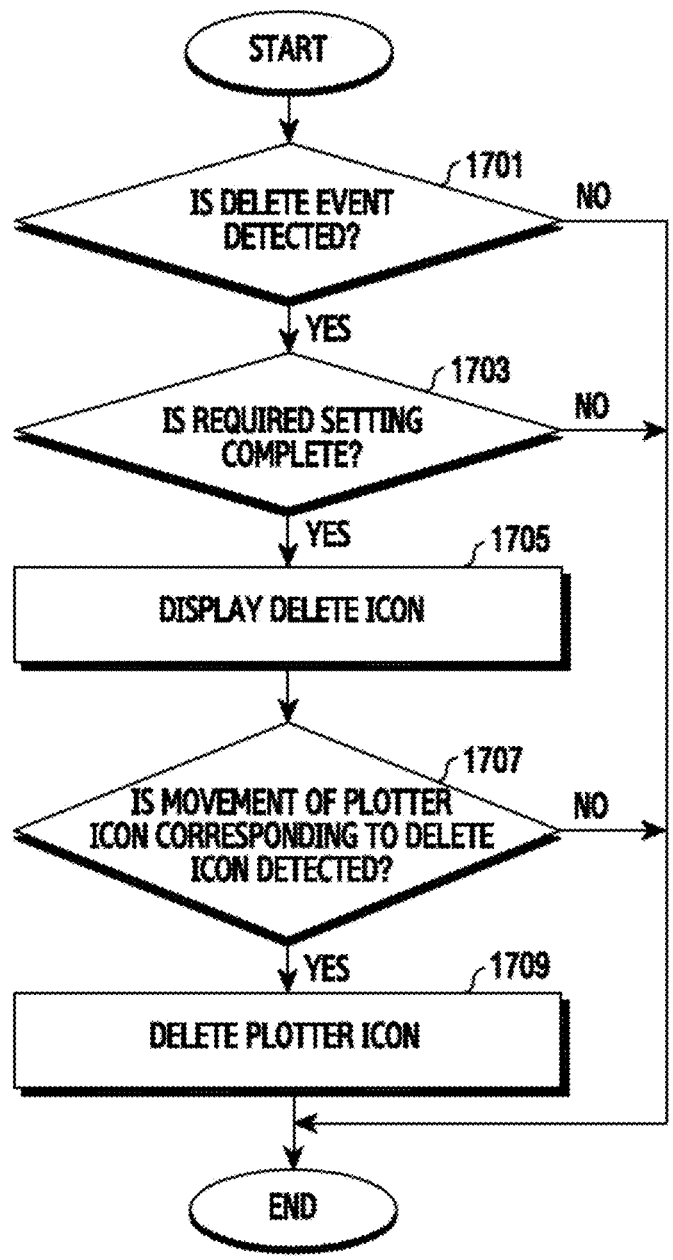
FIG. 17 is a flow chart illustrating a method of deleting a plotter icon by an electronic device according to various embodiments of the present disclosure.

FIG. 17 is a flow chart illustrating a flow of deleting a plotter icon by an electronic device according to various embodiments of the present disclosure. Hereinafter, an operation for deleting the plotter icon will be described using the screen configuration shown in FIG. 18.

Figure 18A:
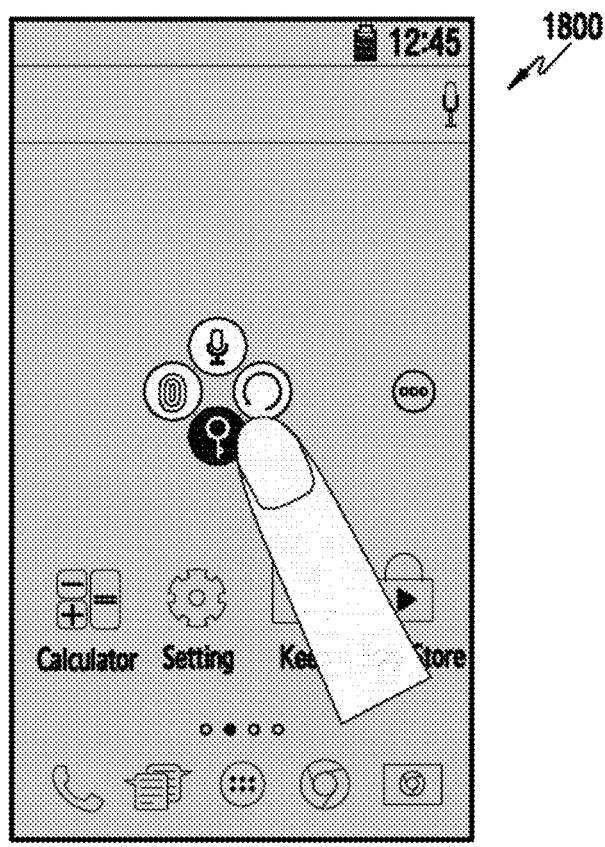
FIGS. 18A to 18B illustrate screen configurations for deleting a plotter icon on an electronic device according to various embodiments of the present disclosure.

Referring to FIG. 17, in operation 1701, the electronic device (for example, the electronic device 101) may determine whether an event for deleting at least one plotter icon displayed on the display occurs. For example, as shown in FIG. 18A, the processor 120 may determine whether a touch input on the plotter icon is detected (indicated by reference numeral 1800). When the touch input on the plotter icon is detected, the processor 120 may determine whether the duration time of the corresponding touch input exceeds the reference time. For example, the processor 120 may determine whether the user's gesture input corresponding to a delete event of the plotter icon is detected.

In operation 1703, when detecting that the event for deleting the plotter icon has occurred, the electronic device may determine whether the required setup menu (for example, account setup menu) from among the initial setup menu corresponding to the plotter icon completes the setup thereof. For example, the required setup menu may be set by the manufacturer of the electronic device 101, and may be set or changed based on user input information.

Figure 18B:
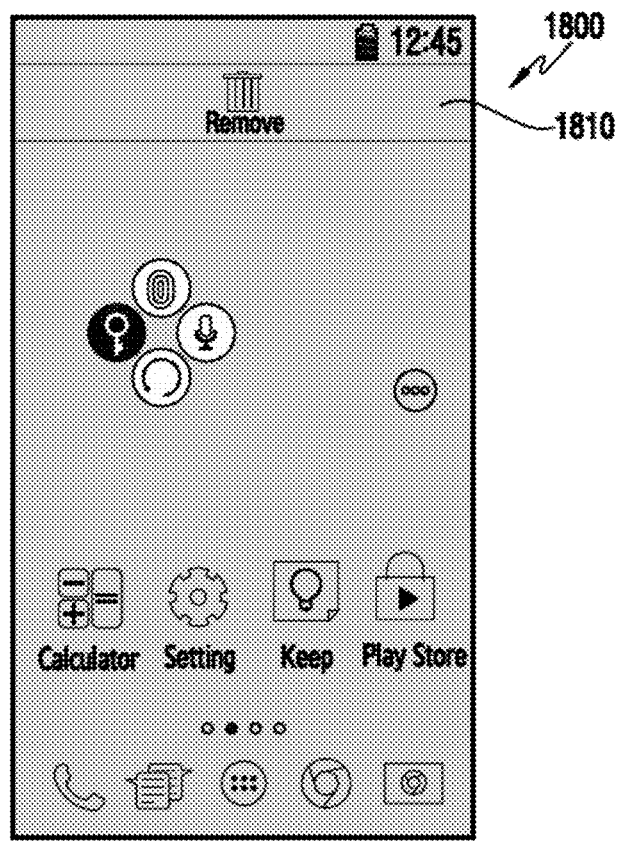

In operation 1705, when the required setup menu from among the initial setup menu corresponding to the plotter icon completes the setup thereof, the electronic device may display a delete icon on at least some areas of the display. For example, when the setup of the "Account Setup menu" that corresponds to the required setup menu is complete, the processor 120 may determine that the delete instruction (command) for the plotter icon is activated. Accordingly, as shown in FIG. 18B, the processor 120 may display the delete icon 1810 for the plotter icon on top of display 160.

In operation 1707, the electronic device may determine whether the movement of the plotter icon corresponding to the delete icon is detected. For example, the processor 120 may determine whether the plotter icon moves within the active region of the deleted icon on the basis of the drag input to the plotter icon. Here, the activity area of the delete icon is a predetermined area in order to activate the delete command of the plotter icon and may include a display area of the delete icon.

In operation 1709, when the movement of the plotter icon corresponding to the delete icon is detected, the electronic device may delete the plotter icon. For example, when the movement of the plotter icon corresponding to the delete icon is detected, the processor 120 may delete all plotter icons displayed on the display 160. For example, when the movement of the plotter icon corresponding to the delete icon is detected, the processor 120 may delete a plotter icon, the movement of which is detected by the drag input, among the plotter icons displayed on the display 160.

According to an embodiment, when an input corresponding to the plotter icon does not detected from the time point at which the delete icon is displayed to the time point at which the reference time has elapsed, the electronic device (for example, electronic device 101) may remove the delete icon displayed on the display (for example, the display 160).

Figure 19:
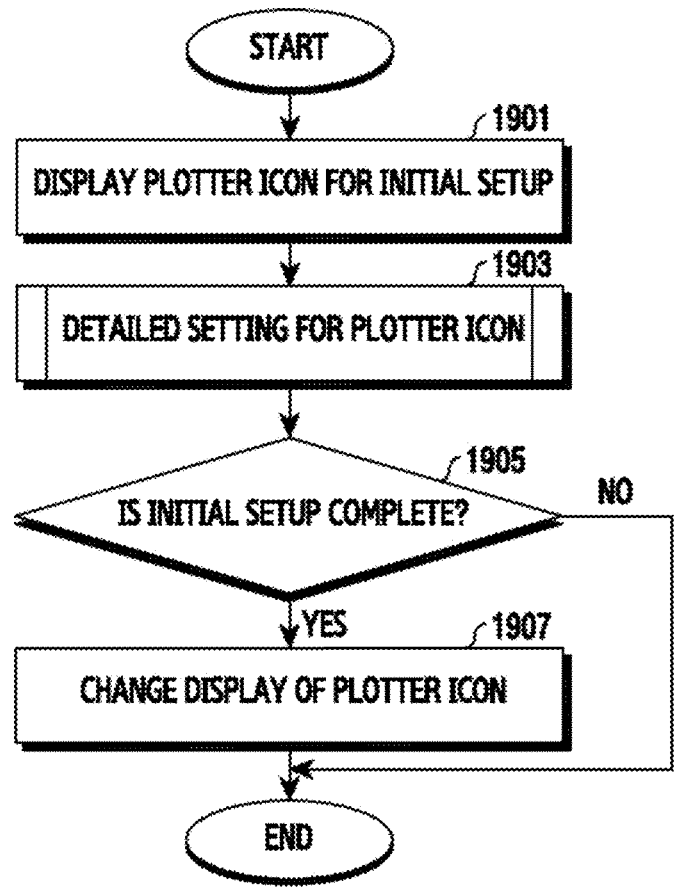
FIG. 19 is a flow chart illustrating a method of changing the display of a plotter icon based on the completion of an initial setup on an electronic device according to various embodiments of the present disclosure.

FIG. 19 is a flow chart illustrating a flow of changing the display of a plotter icon based on the completion of an initial setup by an electronic device according to various embodiments of the present disclosure. Hereinafter, an operation for changing the display of the plotter icon will be described using the screen configuration shown in FIG. 20.

Referring to FIG. 19, in operation 1901, the electronic device (for example, the electronic device 101) may display at least one plotter icon for the initial setup on at least some areas of the display. For example, the processor 120 may control the display 160 to display at least one plotter icon for the initial setup on at least some areas of the home screen so as not to overlap with another icon displayed on the home screen.

In operation 1903, the electronic device may perform the detailed setting for the plotter icon. For example, when detecting a touch input on one plotter icon displayed on the display 160, the processor 120 may control the display 160 to display the detail settings window for the detail setting of the corresponding plotter icon. The processor 120 may perform the detailed setting for the plotter icon based on the input information corresponding to the detailed setting window.

In operation 1905, the electronic device may determine whether the setup for the initial setup menus corresponding to the plotter icon is complete. For example, the processor 120 may determine whether the detailed setting for the initial setup menus corresponding to the plotter icon displayed on the display 160 is complete.

Figure 20A:
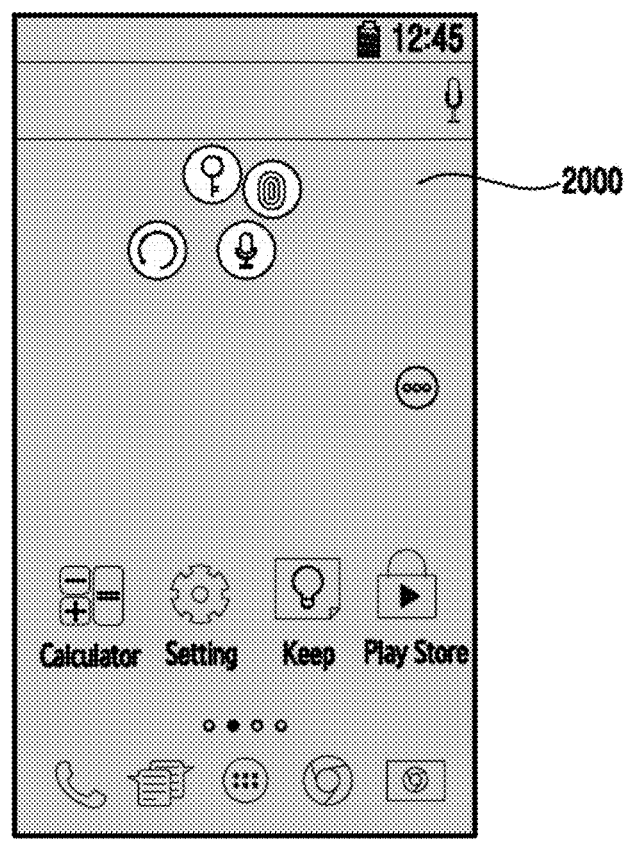
FIGS. 20A to 20E illustrate screen configurations for changing the display of a plotter icon based on the completion of an initial setup on an electronic device according to various embodiments of the present disclosure.
Figure 20B:
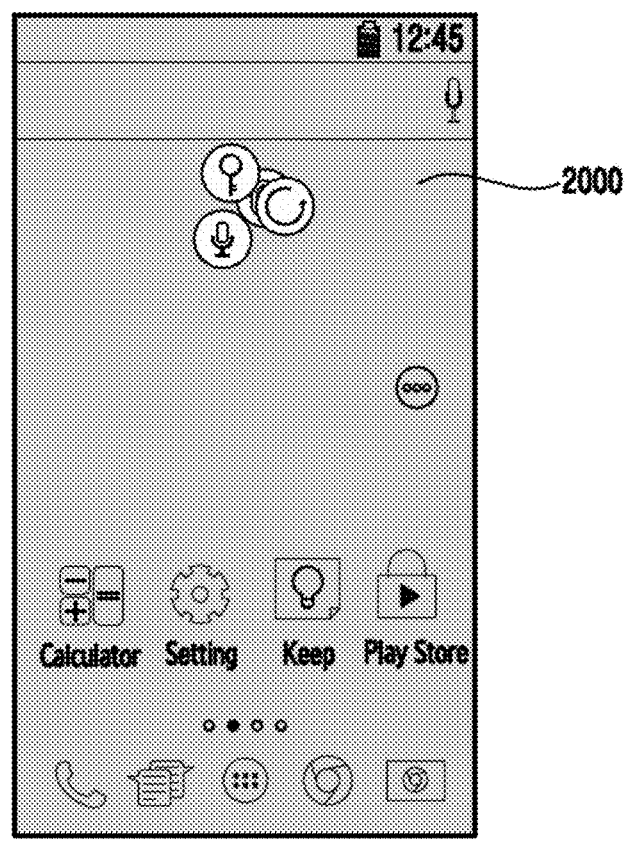
Figure 20C:
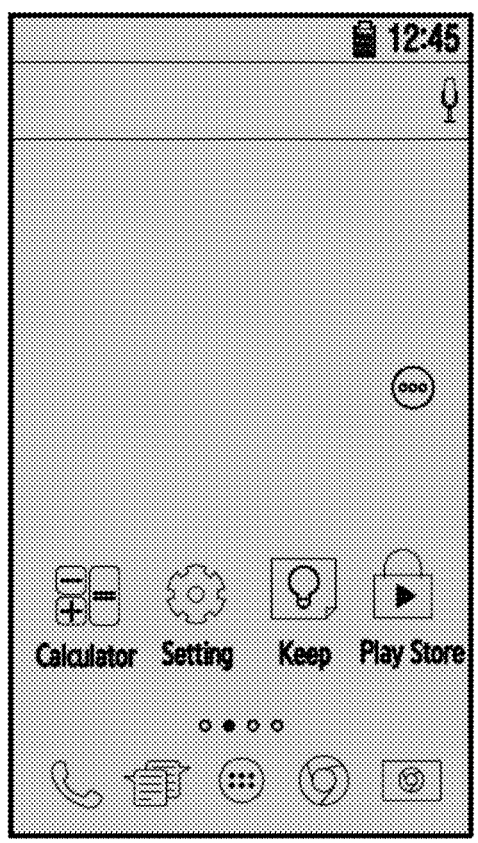
Figure 20D:
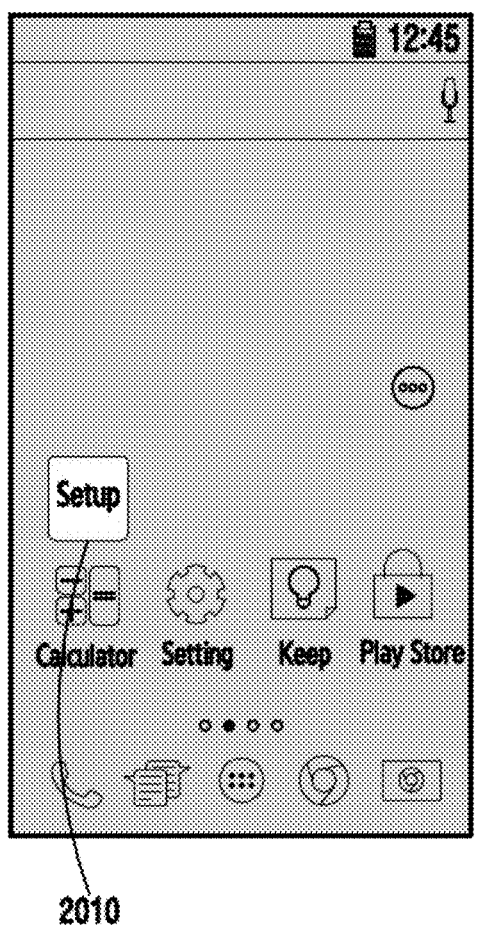
Figure 20E:
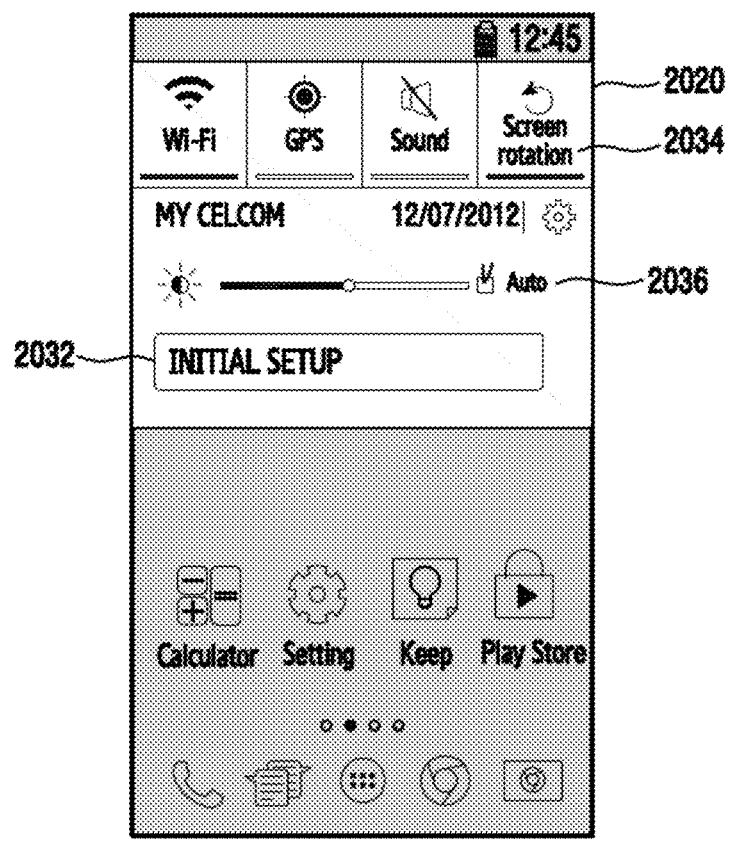

In operation 1907, when the setup for the initial setup menus corresponding to the plotter icon is complete, the electronic device may remove or change the display of the plotter icon displayed on the display. For example, when the setup for the initial setup menus corresponding to the plotter icon is complete, as shown in FIGS. 20A to 20B, the processor 120 may control the display 160 to output visual effects 2000 such that each of the plotter icons floating in the air or water passes through a specific or desired point. As shown in FIG. 20C, the processor 120 may remove, from the display 160, the display of the plotter icon so as to correspond to a visual effect of passing through a specific or desired point. For example, the processor 120 may hide the plotter icon in at least some areas (for example, an edge area) of the display 160 based on the visual effect of passing through a specific or desired point. For example, as shown in FIG. 20D, the processor 120 may modify the plotter icon to the shape of another icon 2010 and display the same on the home screen on the basis of the visual effect of passing through a specific or desired point. For example, as shown in FIG. 20E, the processor 120 may display the setup complete information for the initial setup menus corresponding to the plotter icon on a notification panel 2020. The notification panel 2020 may include an initial setup button 2032, at least one default setup button 2034, and a brightness adjustment bar 2036.

According to various embodiments of the present disclosure, the electronic device may remove or change the display of at least one plotter icon, the initial setup of which is complete, among the plurality of plotter icons for the initial setup.

According to various embodiments of the present disclosure, in response to the occurrence of a setting information change event, the electronic device may update the setting of the electronic device based on the setting information corresponding to the plotter icon. For example, when the initial setup of at least one plotter icon is complete, as shown in FIG. 20D or FIG. 20E, the processor 120 may modify the display format of the plotter icon, the setup of which is complete, and store the setting information of the plotter icon. When detecting the occurrence of the setting information change event, the processor 120 may update the settings of the electronic device based on the previously stored setting information of the plotter icon. For example, the setting information change event may be generated based on the selection input of another icon 2010 shown in FIG. 20D or a selection input of the initial setup button 2032 shown in FIG. 20E.

According to various embodiments of the present disclosure, when the display of the plotter icon is modified in response to the initial setup completion, the electronic device may update the initial setup based on the input information on the display of the modified plotter icon.

Figure 21:
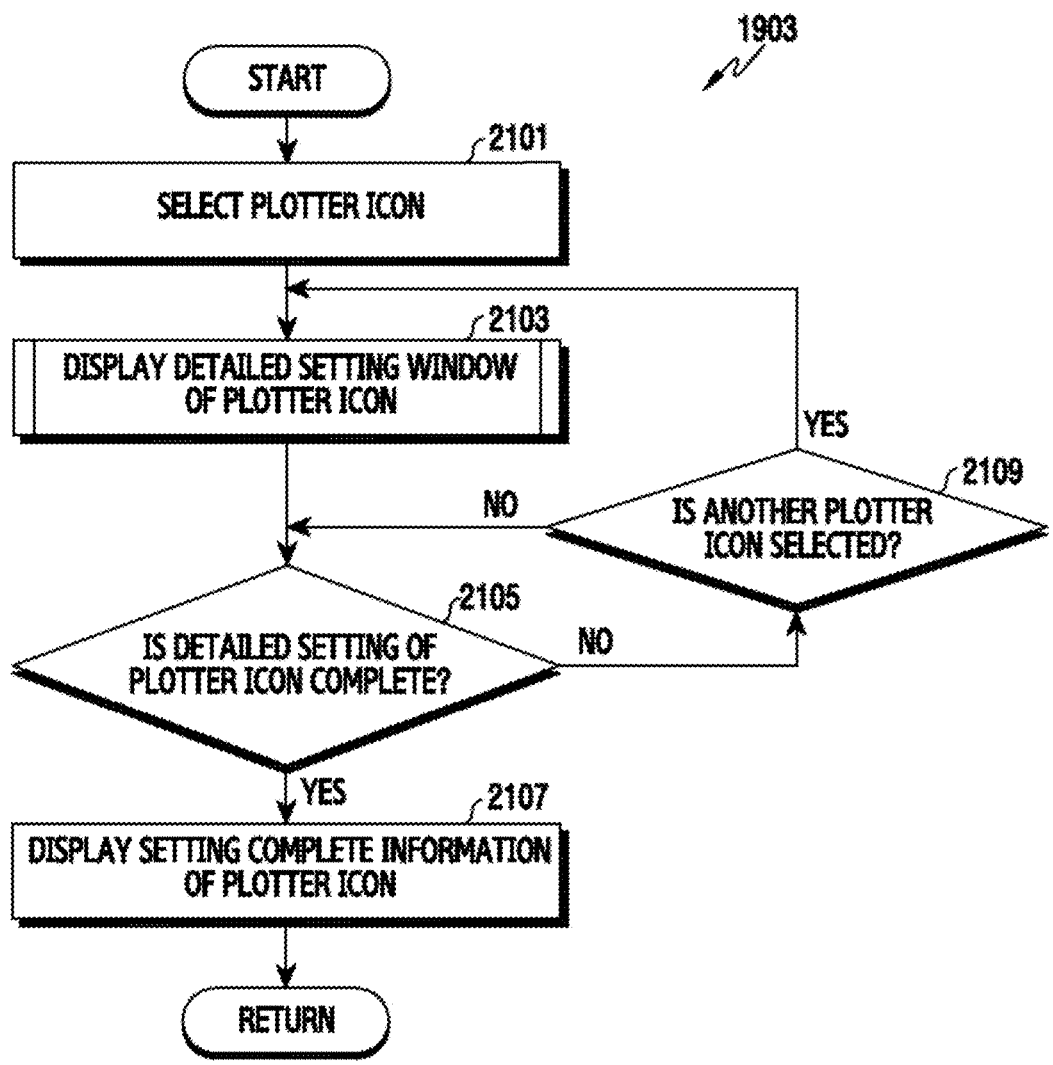
FIG. 21 is a flow chart illustrating a method for an initial setup corresponding to a plotter icon on an electronic device according to various embodiments of the present disclosure.

FIG. 21 is a flow chart illustrating initial setup corresponding to a plotter icon by an electronic device according to various embodiments of the present disclosure. Hereinafter, an operation for performing a detailed setting for the plotter icon in the operation 1903 of FIG. 19 will be described using a screen configuration illustrated in FIG. 23.

Referring to FIG. 21, in operation 2101, when at least one plotter icon is displayed on at least some areas of the home screen (for example, the operation 1901 of FIG. 19), the electronic device (for example, electronic device 101) may select a plotter icon for performing the detailed setting based on the input information detected through the input/output interface. For example, the processor 120 may detect a plotter icon corresponding to the input information detected through the input/output interface 150, from among one or more plotter icons displayed on the display 160.

Figure 23A:
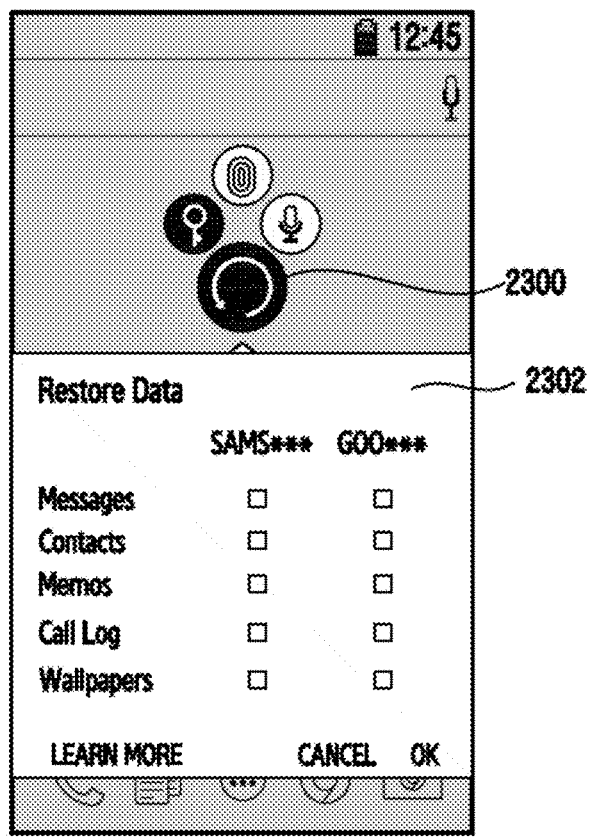
FIGS. 23A to 23F illustrate screen configurations for displaying a detailed setting window for a plotter icon on an electronic device according to various embodiments of the present disclosure.

In operation 2103, the electronic device may display, on the display, a detailed setting window of the plotter icon for performing the detailed setting. For example, as shown in FIG. 23A, when a plotter icon 2300 corresponding to a data synchronization menu is selected, the processor 120 may control the display 160 to display a detailed setting window 2302 for the data synchronization. According to an embodiment of this disclosure, the display 160 may display the detailed setting window 2302 for data synchronization based on a visual effect such that a detailed setting window 2302 having a card shape comes out of the plotter icon 2300.

In operation 2105, the electronic device may determine whether the detailed setting of the initial setup menu corresponding to the plotter icon is complete, through the detailed setting window of the plotter icon. For example, the processor 120 may determine whether the detailed setting of the initial setup menu corresponding to the plotter icon is complete, based on at least one of an amount of input information corresponding to the detailed setting window of the plotter icon and whether to press an "Acknowledge" button" (OK" button).

Figure 23B:
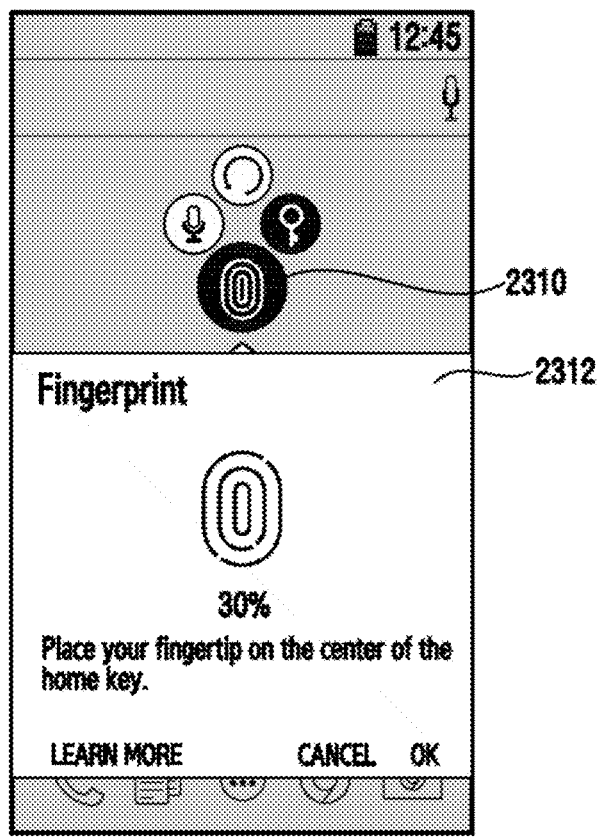

In operation 2107, when the detailed setting for the initial setup menu corresponding to the plotter icon is complete, the electronic device may display the setup complete information of the plotter icon. For example, as shown in FIG. 23E, when the settings of the account setup menu and the data synchronization menu are completed, the processor 120 may update display parameters (for example, color, size) of the plotter icon displayed on the display 160 in order to indicate the setup complete information on the plotter icon corresponding to the account setup menu and data synchronization menu (indicated by reference numeral 2340). In addition, when the setting of an audio setup menu is complete, as shown in FIG. 23F, the processor 120 may update display parameters (for example, color, size) of the plotter icon displayed on the display 160 in order to indicate the setup complete information of the plotter icon corresponding to the audio setup menu (indicated by reference numeral 2350).

In operation 2109, when the detailed setting for the initial setup menu corresponding to the plotter icon is not complete, the electronic device may determine whether an input for selecting another plotter icon is detected. For example, as shown in FIG. 23B, the processor 120 may determine whether an input for selecting the plotter icon 2310 corresponding to a fingerprint setup menu is detected through the input/output interface 150. For example, the processor 120 may determine whether the right side or left side drag input with respect to the detailed setting window 2302 of FIG. 23A is detected through the input/output interface 150.

When the input for selecting other plotter icons is not detected, in operation 2105, the electronic device may determine whether the detailed setting of the initial setup menu corresponding to the plotter icon is complete, through the detailed setting window (for example, the detailed setting window indicated by operation 2103) of the plotter icon.

When the input for selecting other plotter icons is detected, the electronic device may display, on the display, the detailed setting window of other plotter icon through which the selection input is detected. For example, as shown in FIG. 23B, when the input for selecting the plotter icon 2310 corresponding to the fingerprint setup menu is detected, the processor 120 may control the display 160 to display a detailed setting window 2312 for a fingerprint setting. For example, display 160 may delete the display of the detailed input window 2302 for data synchronization, based on a visual effect such that the detailed input window 2302 for the data synchronization is absorbed into the plotter icon 2300. Thereafter, the display 160 may display the detailed setting window 2312 for the fingerprint setting based on a visual effect such that the detailed setting window 2312 of a card shape comes out of the plotter icon 2310. For example, the display 160 may output a visual effect such that the screen of the detailed input window 2302 for data synchronization is switched to the detailed setting window 2312 for the fingerprint setting.

Figure 23C:
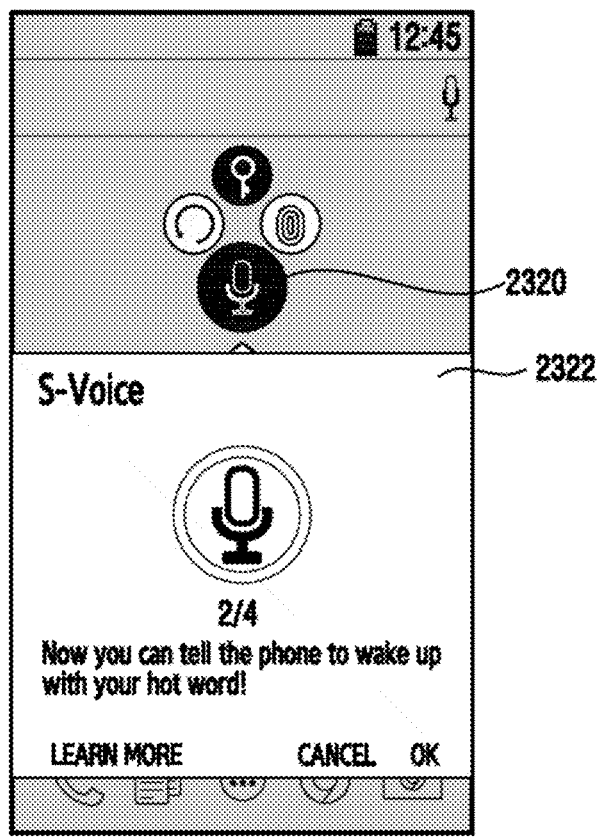

In addition, as shown in FIG. 23C, when the input for selecting the plotter icon 2320 corresponding to the audio setup menu is detected, the processor 120 may control the display 160 to display a detailed setting window 2322 for the audio setting. For example, the processor 120 may control the display 160 to switch the detailed input window 2312 for fingerprint setting displayed on the display 160 to the detailed setting window 2322 for the audio setting. For example, the display 160 may change the detailed input window based on the visual effect such that the detailed setting window 2312 is absorbed into the plotter icon 2310 and the detailed setting window 2322 for audio setting comes out of the plotter icon 2320. For example, the display 160 may output a visual effect such that the screen of the detailed input window 2312 for fingerprint setting is switched to the detailed setting window 2322 for the audio setting.

Figure 22:
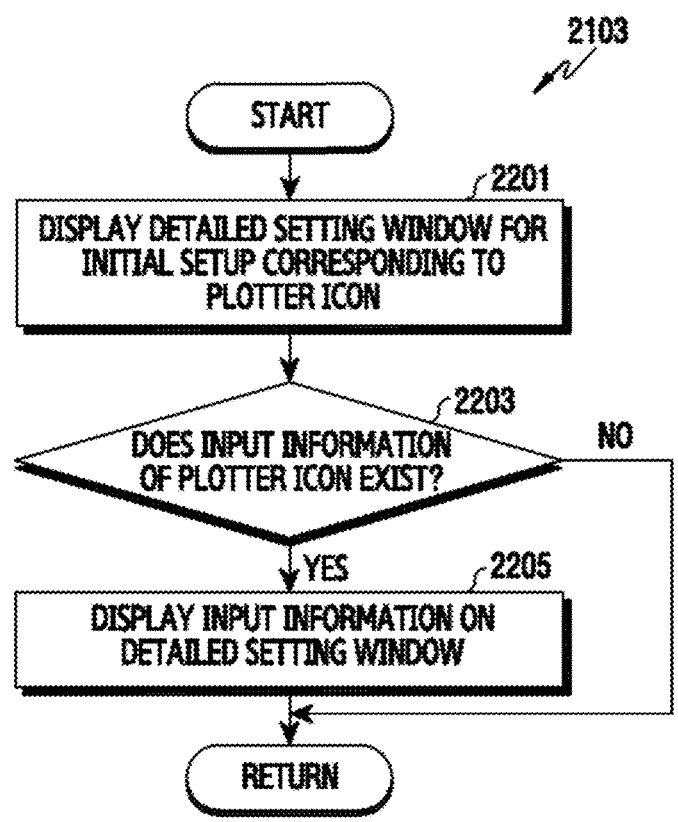
FIG. 22 is a flow chart illustrating a method of displaying a detailed setting window for a plotter icon on an electronic device according to various embodiments of the present disclosure.

FIG. 22 is a flow chart illustrating a flow of displaying a detailed setting window for a plotter icon by an electronic device according to various embodiments of the present disclosure. Hereinafter, an operation for displaying a detailed setting for the plotter icon in the operation 2103 of FIG. 21 will be described using a screen configuration illustrated in FIG. 23.

Referring to FIG. 22, in operation 2201, when a plotter icon for performing the detailed setting is selected (for example, the operation 2101 of FIG. 21), the electronic device (for example, electronic device 101) may display, on the display, the detailed setting window of the plotter icon corresponding to the input information detected through the input/output interface. For example, as shown in FIG. 23A, when an input for selecting the plotter icon 2300 corresponding to a data synchronization menu is detected, the processor 120 may control the display 160 to display a detailed setting window 2302 corresponding to the data synchronization menu.

In operation 2203, the electronic device may determine whether information previously input through the detailed setting window of the plotter icon exists. For example, the processor 120 may determine whether the information previously input through the detailed setting window of plotter icon exists in the memory 130, in order to set the initial setup menu corresponding to the plotter icon.

Figure 23D:
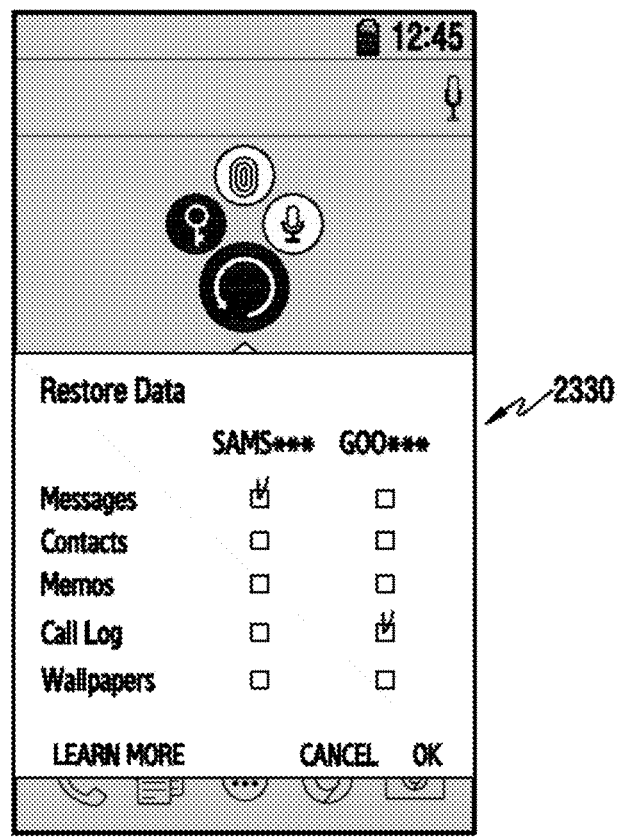
Figure 23E:
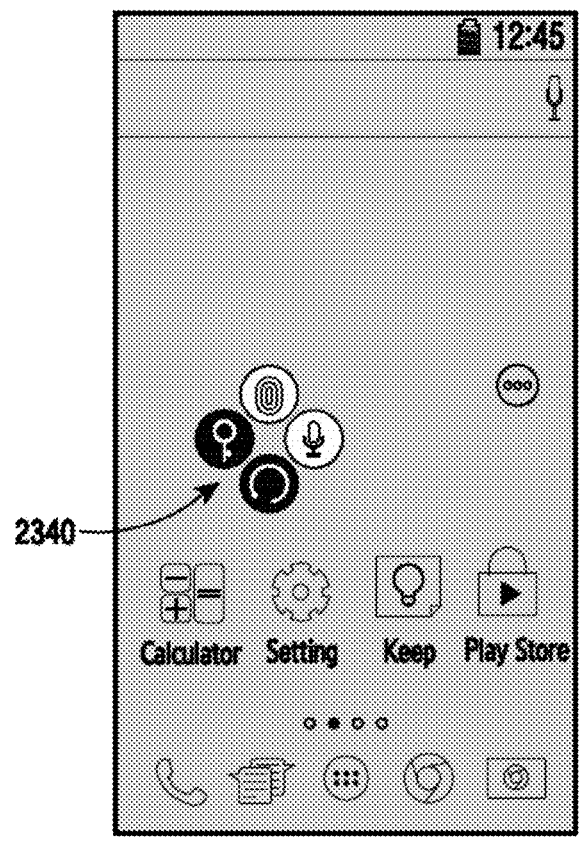
Figure 23F:
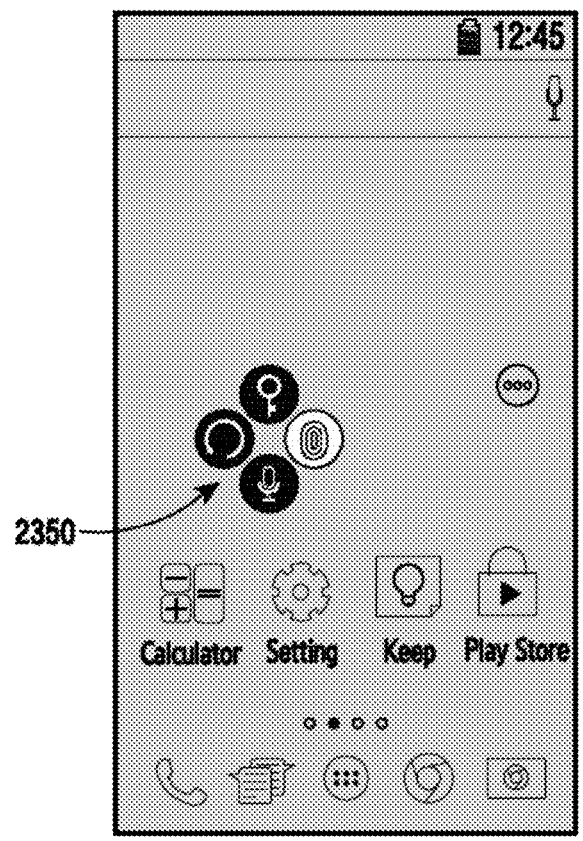

In operation 2205, when the information previously input through the detailed setting window of the plotter icon is present, the electronic device may display the previously input information on the detailed setting window of the plotter icon displayed on the display. For example, when the input information (for example, selection information) previously input for setting the data synchronization menu is detected from the memory 130, as shown in FIG. 23D, the processor 120 may display the input information (for example, selection information) 2330, which was previously input to the detailed setting window 2302 corresponding to the data synchronization menu.

Figure 24:
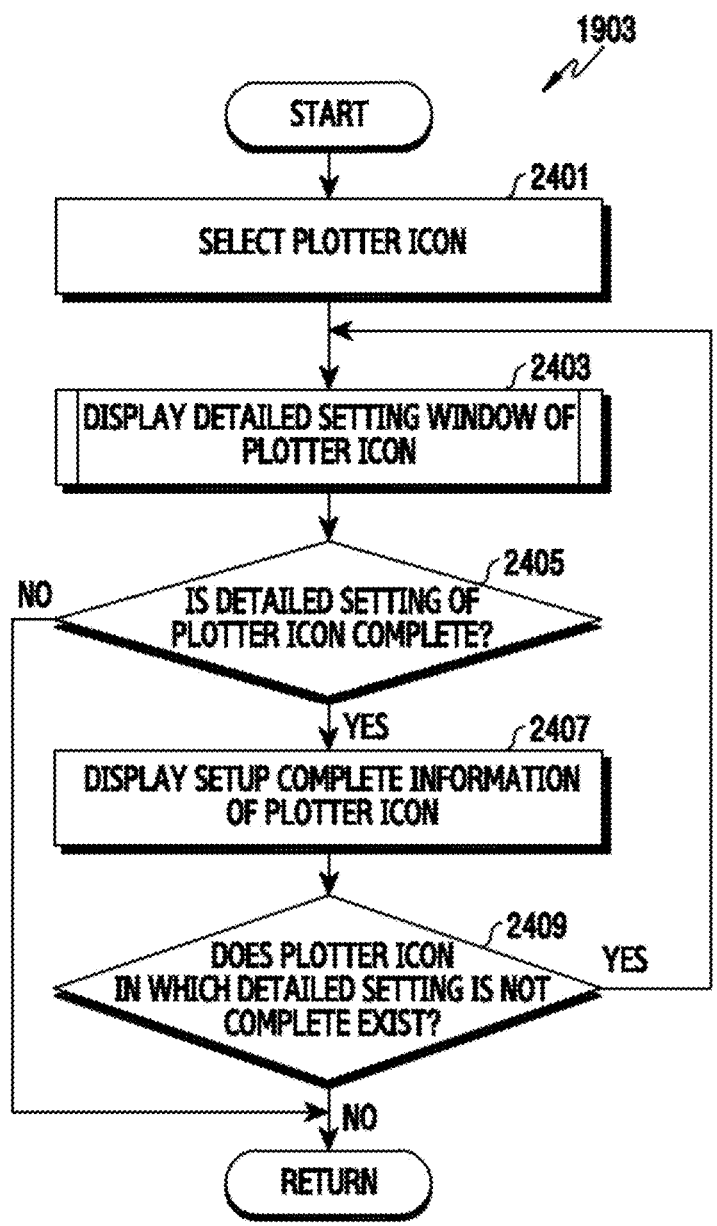
FIG. 24 is a flow chart illustrating a method of automatically displaying a detailed setting window for a plotter icon on an electronic device according to various embodiments of the present disclosure.

FIG. 24 is a flow chart illustrating a flow of displaying a detailed setting window for a plotter icon by an electronic device according to various embodiments of the present disclosure. Hereinafter, an operation for performing a detailed setting for the plotter icon in the operation 1903 of FIG. 19 will be described using a screen configuration illustrated in FIG. 23.

Referring to FIG. 24, in operation 2401, when at least one plotter icon is displayed on at least some areas of the home screen (for example, the operation 1901 of FIG. 19), the electronic device (for example, the electronic device 101) may select a plotter icon for performing the detailed setting from among plotter icons displayed on the display. For example, the processor 120 may detect a plotter icon corresponding to the input information detected through the input/output interface 150, from among one or more plotter icons displayed on the display 160.

In operation 2403, the electronic device may display, on the display, the detailed setting window of the plotter icon for performing the detailed setting. For example, the processor 120 may display the input information previously input to the detailed setting window of the plotter icon for performing the detailed setting such as operation 2201 to operation 2205 of FIG. 22. For example, as shown in FIG. 23D, when the input information (for example, selection information) previously input through the detailed setting window 2302 corresponding to the synchronization menu is present, the processor 120 may display the input information 2330, which was previously input to the detailed setting window 2302.

In operation 2405, the electronic device may determine whether the detailed setting of the initial setup menu corresponding to the plotter icon is complete, through the detail setting window of the plotter icon. For example, the processor 120 may determine whether the detailed setting of the initial setup menu corresponding to the plotter icon is complete, based on at least one of an amount of input information corresponding to the detailed setting window of the plotter icon and whether to press an "Acknowledge" button (for example, an "approval" button).

In operation 2407, when the detailed setting for the initial setup menu corresponding to the plotter icon is complete, the electronic device may display the setup complete information of the plotter icon. For example, as shown in FIG. 23E, when the settings of the account setup menu and the data synchronization menu are completed, the processor 120 may update display parameters (for example, color, size) of the plotter icon corresponding to the account setup menu and data synchronization menu and display the setup complete information for the plotter icon. For example, when the settings of the account setup menu, the data synchronization menu, and the audio setup menu are completed, as shown in FIG. 23F, the processor 120 may update display parameters of the plotter icon corresponding to the data synchronization menu and audio setup menu and display the setup complete information for the plotter icon.

In operation 2409, the electronic device may determine whether there is a plotter icon in which a detailed setting for the initial setup menu is not complete.

When there is a plotter icon in which the detailed setting for the initial setup menu is not complete, in operation 2403, the electronic device may display, on the display, the detailed setting window of the plotter icon in which the detailed setting is not complete. For example, when there is a plurality of plotter icons in which the detailed setting is not complete, the processor 120 may select a plotter icon for displaying a detailed setting window based on the priority of the plotter icon. The processor 120 may control the display 160 so as to display the detailed setting window of the plotter icon selected based on the priority. For example, the detailed input window displayed on the display 160 can be changed based on the visual effect such that the detailed input window of the plotter icon in which the initial setting is complete absorbs into the corresponding plotter icon, and the detailed input window of the plotter icon in which the initial setting is not complete comes out of the corresponding plotter icon. Here, the priority of the plotter icon may be determined by the importance of the initial setup menu corresponding to the plotter icon or the user input information.

Figure 25:
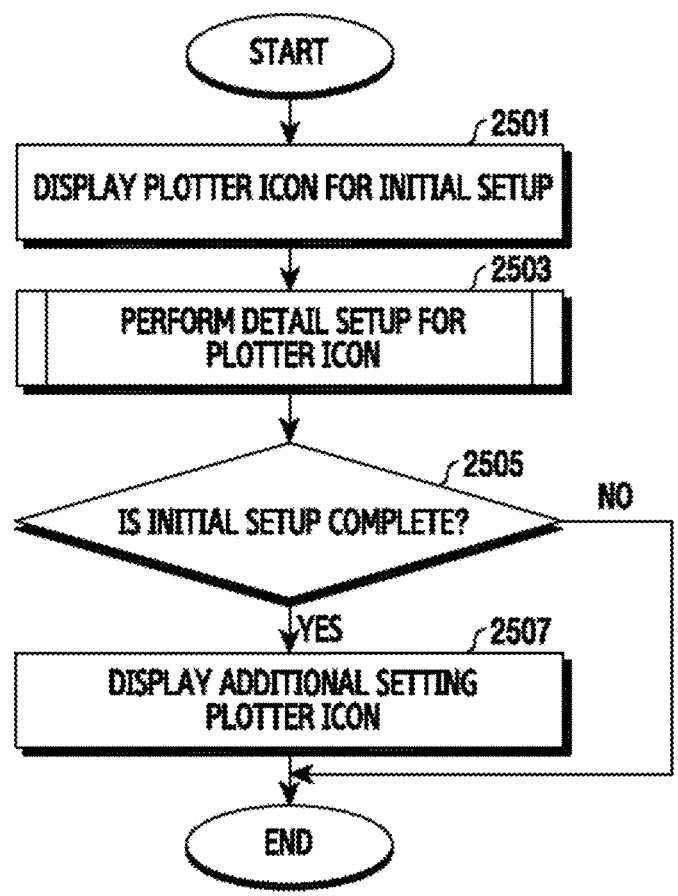
FIG. 25 is a flow chart illustrating a method of displaying a plotter icon for an additional setup on an electronic device according to various embodiments of the present disclosure.

FIG. 25 is a flow chart illustrating a flow of displaying a plotter icon for an additional setup by an electronic device according to various embodiments of the present disclosure. Hereinafter, an operation for displaying a plotter icon for additional setup will be described using the screen configuration shown in FIG. 26.

Referring to FIG. 25, in operation 2501, the electronic device (for example, the electronic device 101) may display at least one plotter icon for the initial setup on the display. For example, the display 160 may display at least one plotter icon for an initial setup as a single set, so as not to overlap with another icon displayed on the home screen.

In operation 2503, the electronic device may perform the detailed setting for the initial setup menu corresponding to the plotter icon. For example, the processor 120 may perform a detailed setting of the initial setup menu corresponding to the plotter icon, such as operation 2101 to operation 2109 of FIG. 21. For example, when detecting a touch input on one plotter icon of the plotter icons displayed on the display 160, the processor 120 may control the display 160 to display the detail setting window for setting the initial setup menu corresponding to the plotter icon. The processor 120 may perform a detailed setting of the initial setup menu corresponding to the plotter icon based on the input information corresponding to the detailed setting window detected through the input/output interface 150.

In operation 2505, the electronic device may determine whether the setting for the initial setup menu corresponding to the plotter icon is complete. For example, the processor 120 may determine whether the detailed setting for the initial setup menu corresponding to all plotter icons displayed on the display 120 is complete. According to an embodiment of this disclosure, the processor 120 may determine whether the detailed setting of the initial setup menu corresponding to each of the plotter icons is complete, based on at least one of an amount of input information corresponding to the detailed setting window of each of the plotter icons and whether to press an "Acknowledge" button (for example, approval button).

Figure 26A:
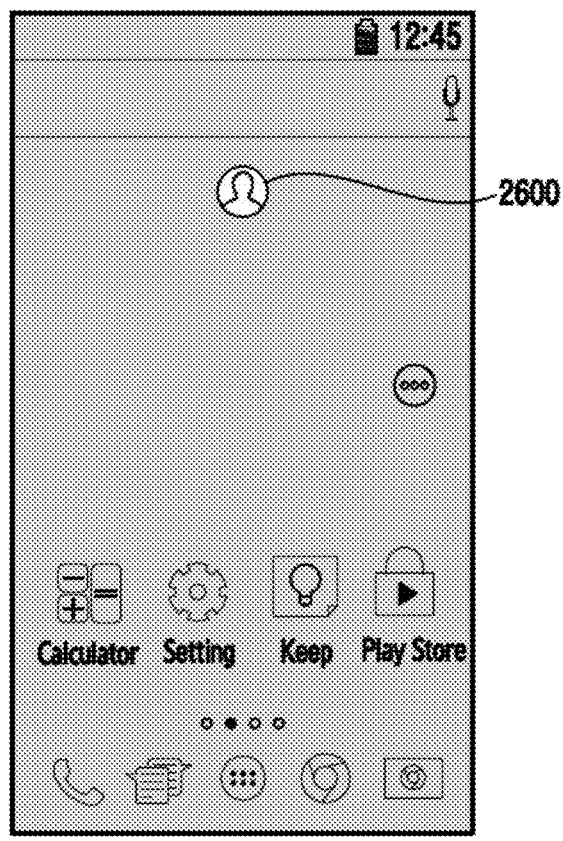
FIGS. 26A to 26H illustrate screen configurations for displaying a plotter icon for an additional setup on an electronic device according to various embodiments of the present disclosure.
Figure 26B:
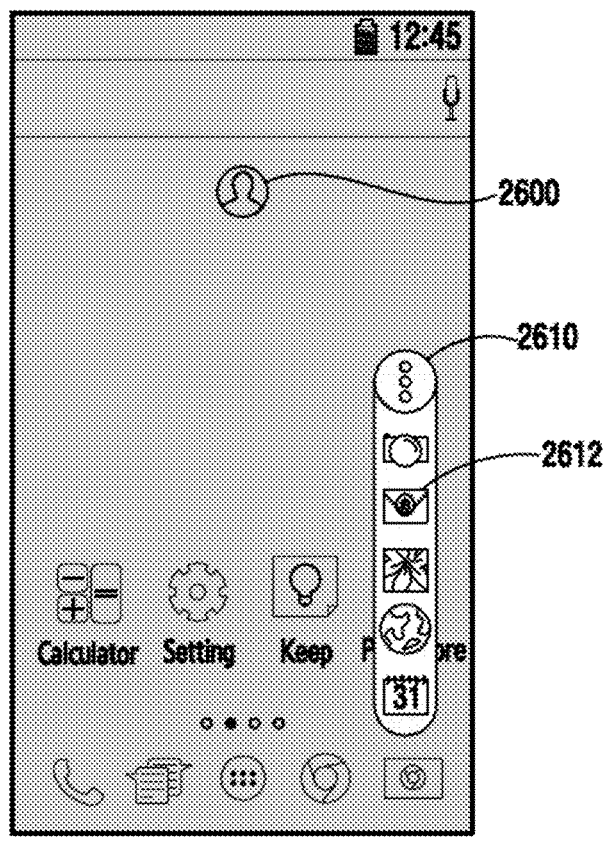
Figure 26C:
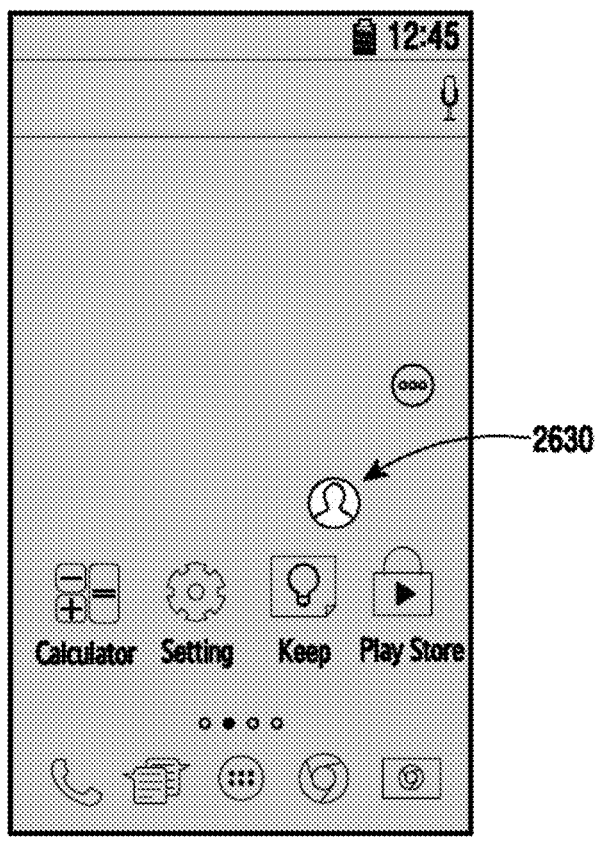

In operation 2507, when the setting for the initial setup menus corresponding to the plotter icon is complete, the electronic device may display the plotter icon for additional setting on the display. For example, when the setting for the initial setup menus corresponding to the plotter icon is complete, the processor 120 may delete the display of the plotter icon from the display 160 based on the visual effects such that each of the plotter icons floating in the air or water passes through a specific or desired point. Thereafter, as shown in FIG. 26A, the processor 120 may control the display 160 to display a plotter icon 2600 for an additional setting (for example, a plotter icon for a user profile setting). For example, as shown in FIG. 26B, when another icon 2610 shown on the home screen (for example, a quick menu icon) is executed (indicated by reference numeral 2612), the plotter icon 2600 can be switched to a deactivated state (indicated by reference numeral 2620). In addition, the position of the plotter icon 2600 may be flexibly changed to correspond to the drag input of the plotter icon 2600, as shown in FIG. 26C (indicated by reference numeral 2630).

Figure 26D:
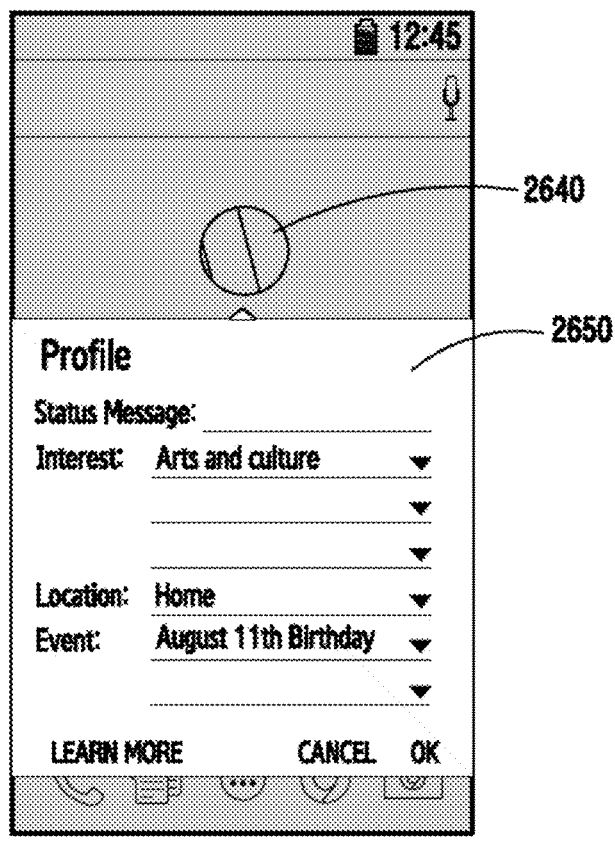

According to an embodiment, when the input for selecting the plotter icon 2600 for an additional setting is detected, the electronic device (for example, electronic device 101) may perform a setting for the setup menu corresponding to the plotter icon 2600. For example, when the input for selecting the plotter icon 2600 for an additional setting is detected, as shown in FIG. 26D, the processor 120 may control the display 160 to display a detailed setting window 2650 for a user profile setting. According to an embodiment of this disclosure, the display 160 may display the detailed setting window 2650 for the user profile setting based on a visual effect such that a detailed setting window 2650 having a card shape comes out of the plotter icon 2600. In addition, the processor 120 may activate a camera module so as to acquire the user's profile picture and display a preview image 2640 on a display area of the plotter icon 2600. At this time, the display 160 may display a visual indication (for example, glow) indicating that a picture-taking can be made through a preview image 2540. When a touch input on the preview image 2640 is detected, the processor 120 may capture the corresponding preview image and store the captured preview image as the user's profile image (indicated by reference numeral 2642). The processor 120 may re-capture the user's profile image in response to an additional touch input on the preview image 2640.

Figure 26E:
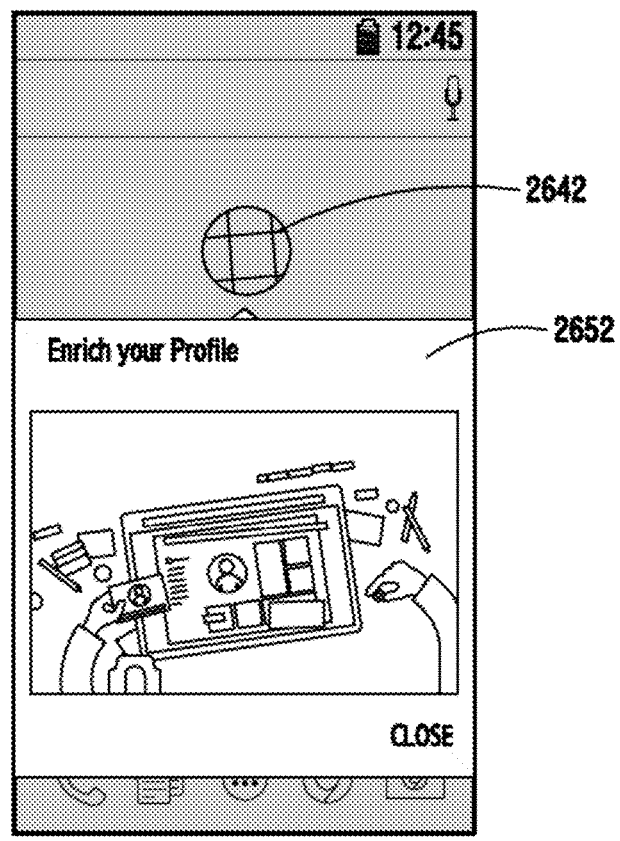

According to an embodiment, the electronic device (for example, electronic device 101 may display, on the display, a description corresponding to the additional setup menu, based on the input information for the detailed input window 2650 for additional setting. For example, when left or right drag inputs to the detailed setup window 2650 for the user profile setting are detected, as shown in FIG. 26E, the processor 120 may display, on the display 160, the description 2652 corresponding to the user profile setting. Here, the description 2652 corresponding to the user profile setting may include a service corresponding to the user profile setting or a user profile setting method.

Figure 26F:
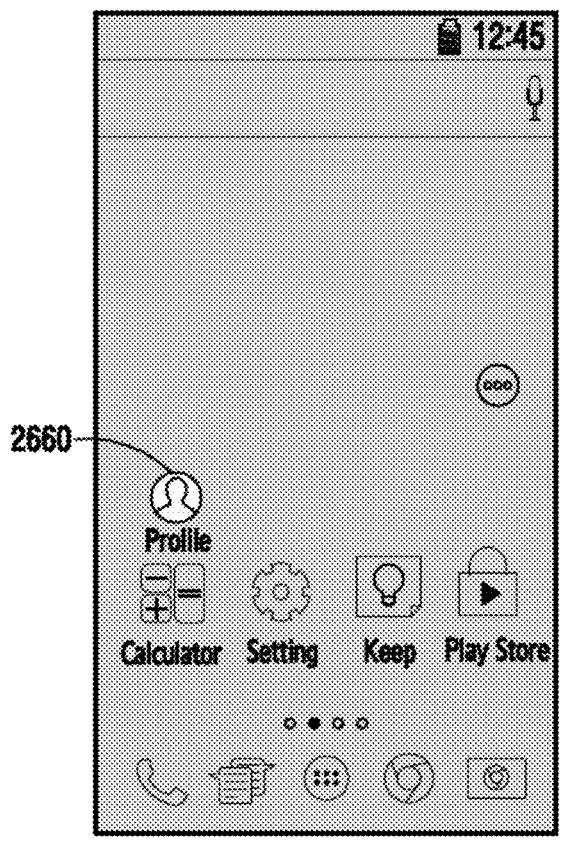

According to an embodiment, when the setting of the additional setup menu is complete, the electronic device (for example, electronic device 101) may modify the plotter icon corresponding to the additional setting in a form of an application icon and display the modified icon on the display. For example, as shown in FIG. 26F, the processor 120 may control the display 160 to display an application icon 2660 by using a user profile image.

Figure 26G:
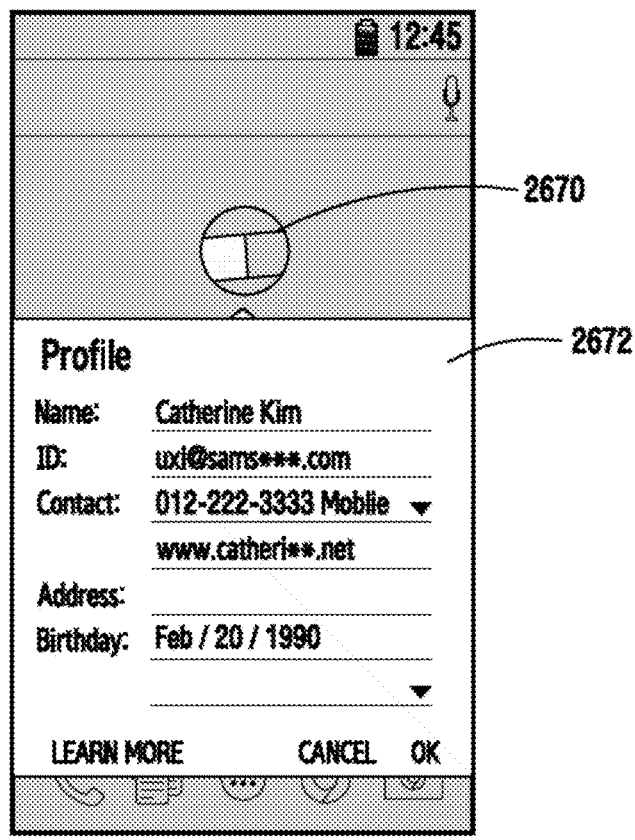

According to an embodiment, the electronic device (for example, electronic device 101 may perform the setting for the additional setup menu based on the input information on the application icon corresponding to the additional setting. For example, when the input for selecting the application icon 2660 for an additional setting is detected, as shown in FIG. 26G, the processor 120 may control the display 160 to display a detailed setting window 2672 for the user profile setting. In this case, the processor 120 may display the information previously input for the user profile setting on the detailed settings window 2672. In addition, the processor 120 may activate a camera module so as to update the user's profile picture and display the preview image 2670 on at least some areas of the display 160. When a touch input on the preview image 2670 is detected, the processor 120 may capture the corresponding preview image and update the user's profile image.

Figure 26H:
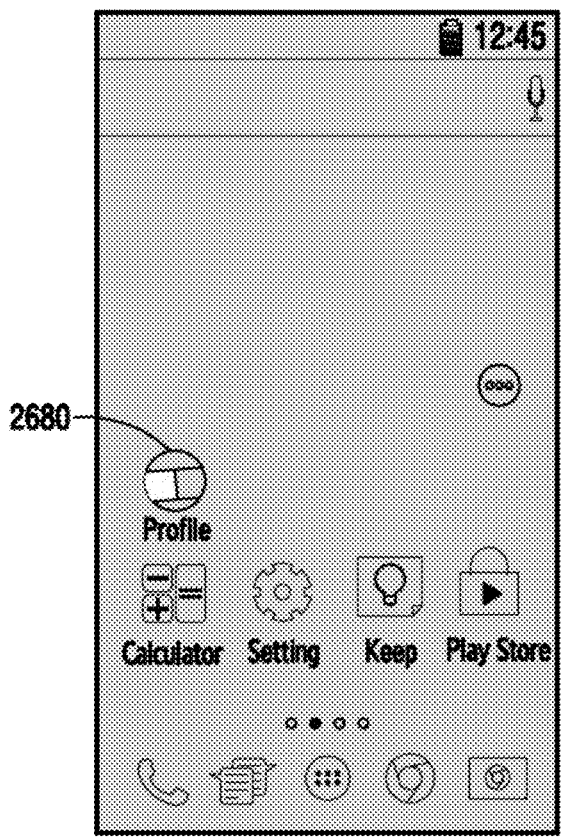

According to an embodiment, when the setting of the additional setup menu is complete, the electronic device (for example, electronic device 101) may modify the plotter icon corresponding to the additional setting in a form of an application icon and display the modified icon on the display. For example, when the user's profile image is changed, as shown in FIG. 26H, the processor 120 may control the display 160 to display an application icon 2680 by using the changed user's profile image.

Figure 27:
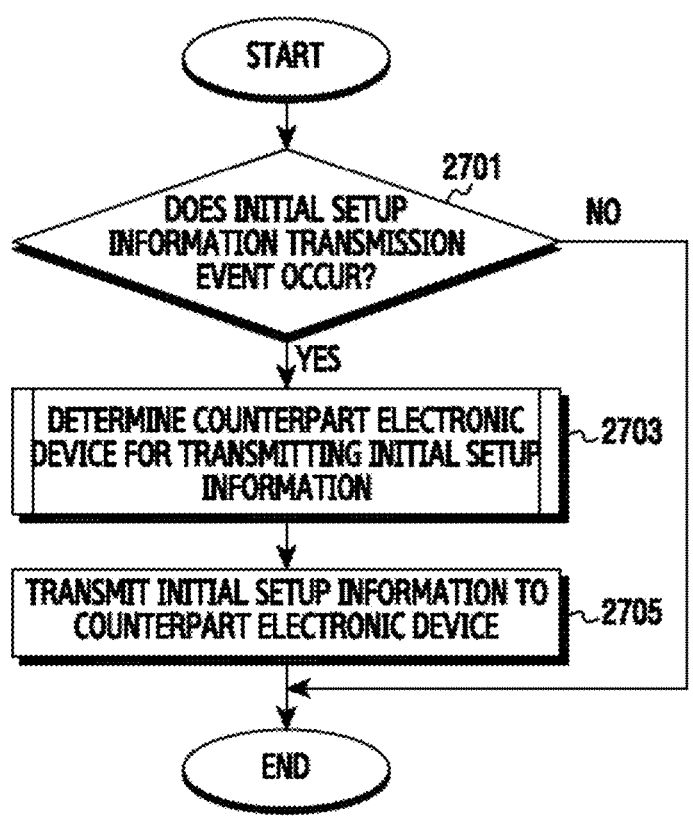
FIG. 27 is a flow chart illustrating a method of transmitting setting information on an electronic device according to various embodiments of the present disclosure.

FIG. 27 is a flow chart illustrating a flow of transmitting setting information by an electronic device according to various embodiments of the present disclosure.

Referring to FIG. 27, in operation 2701, the electronic device (for example, the electronic device 101) may determine whether a transmission event for an initial setup corresponding to a plotter icon occurs. For example, the processor 120 may determine whether a transmission menu for the initial setup is selected from among a control menu for the plotter icon based on the input information detected through the input/output interface 150. For example, the processor 120 may determine whether the movement or gesture of the electronic device 101 corresponding to a transmission event for the initial setup is input through a sensor module. For example, the processor 120 may determine whether to communicate with at least one counterpart electronic device included in a list of counterpart electronic devices for sharing the initial setup information.

In operation 2703, the electronic device may determine a counterpart electronic device for transmitting the initial setup information. For example, the processor 120 may select a counterpart electronic device for transmitting the initial setup information from one or more counterpart electronic devices in which the communication is connected or connectable through the communication interface 170, based on the input information detected through the input/output interface 150. For example, the processor 120 may select a counterpart electronic device corresponding to a transmission event for the initial setup, of one or more counterpart electronic devices in which the communication is connected or connectable through the communication interface 170.

In operation 2705, the electronic device may transmit the initial setup information set by the plotter icon to the counterpart electronic device. For example, the processor 120 may transmit the initial setup information input through the detailed input window of the plotter icon to the counterpart electronic device through the communication interface 170.

Figure 28:
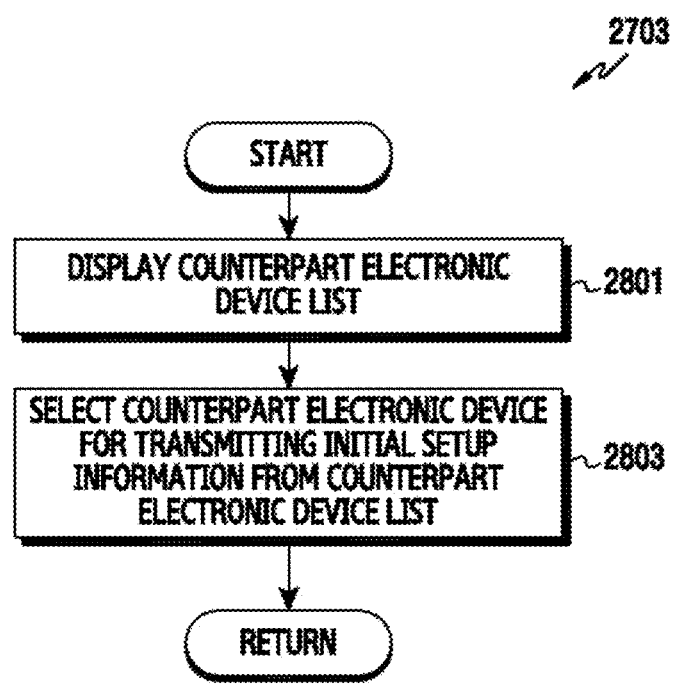
FIG. 28 is a flow chart illustrating a method of selecting, on an electronic device, a counterpart electronic device to which setting information is transmitted according to various embodiments of the present disclosure.

FIG. 28 is a flow chart illustrating a flow of selecting, by an electronic device, a counterpart electronic device to which setting information is transmitted by an electronic device according to various embodiments of the present disclosure. Hereinafter, in operation 2703 of FIG. 27, an operation for determining a counterpart electronic device to which the initial setup information is transmitted.

Referring to FIG. 28, in operation 2801, when a transmission event for the initial setup occurs (for example, the operation 2701 of FIG. 27), the electronic device (for example, the electronic device 101) may display a list of counterpart electronic devices which can transmit data. For example, in response to the occurrence of the transmission event of initial setup information, the processor 120 may control the display 160 to display at least one list of counterpart electronic devices having communication connected or connectable through the communication interface 170.

In operation 2803, the electronic device may select, from the list of counterpart electronic devices displayed on the display, at least one counterpart electronic device for transmitting the initial setup information. For example, the processor 120 may select, from the list of counterpart electronic devices displayed on the display 160, at least one counterpart electronic device from which a touch input is detected.

Figure 29:
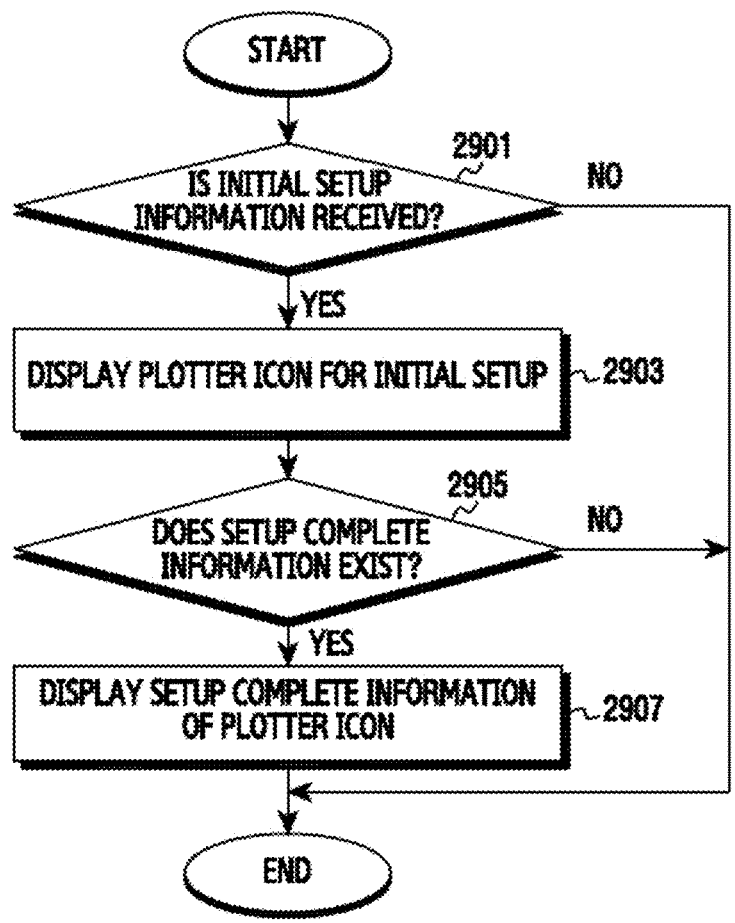
FIG. 29 is a flow chart illustrating a method of performing the same initial setup, on an electronic device, for a counterpart electronic device according to various embodiments of the present disclosure.

FIG. 29 is a flow chart illustrating a flow of performing the same initial setup between an electronic device and a counterpart electronic device according to various embodiments of the present disclosure.

Referring to FIG. 29, in operation 2901, an electronic device (for example, the external electronic device 102 or 104 in FIG. 1) may determine whether initial setup information is received from a counterpart electronic device. For example, the first external electronic device 102 may connect communication with the electronic device 101 through the short-range communications 164. The first external electronic device 102 may determine whether the initial setup information of the electronic device 101 is received through the short-range communications 164.

In operation 2903, when the initial setup information is received from the counterpart electronic device, the electronic device may display, on at least a portion of the home screen, at least one plotter icon corresponding to the initial setup information. For example, as shown in FIGS. 10A to 10D, the first external electronic device 102 may display at least one plotter icon as a single set, on at least a partial area of the home screen, based on visual effects such that at least one plotter icon corresponding to the initial setup information regularly or randomly moving just like floating in air or water.

In operation 2905, the electronic device may determine whether an initial setup menu in which the setup has been completed is included among the initial setup information provided from the counterpart electronic device. For example, the first external electronic device 102 may determine whether there is an initial setup menu in which the setup has been completed from among the setting information of the initial setup menu for an account setting, data synchronization, an authentication setting, and an application setting provided from the electronic device 101.

In operation 2907, when there is an initial setup menu in which the setup has been completed, the electronic device may display the setup complete information of the plotter icon corresponding to the initial setup menu in which the setup has been completed. For example, when the setup of the account setup menu and data synchronization menu from the initial setup information provided from the electronic device 101 has been completed, as shown in FIG. 23E, the first external electronic device 102 may update a display parameter (for example, color, size) of the plotter icon corresponding to the account setup menu and data synchronization menu (indicated by reference numeral 2340).

According to an embodiment, the electronic device may perform the initial setup using the plotter icon corresponding to the initial setup information provided from the counterpart electronic device. For example, the electronic device may input setting information of the initial input menu corresponding to the plotter icon through the detailed input window of the plotter icon. For example, the electronic device may display, on the detailed input window of the plotter icon, input information input from the counterpart electronic device based on the initial setup information provided from the counter electronic device.

According to various embodiments of the present disclosure, when the setup of the initial setup menu corresponding to the plotter icon is not complete, the electronic device (for example, the electronic device 101) may continuously maintain the display of the plotter icon. For example, when the electronic device 101 reboots, the processor 120 may display the plotter icon on at least a part of the home screen.

According to various embodiments of the present disclosure, a method for operating an electronic device includes: performing initial booting of the electronic device; and displaying at least one icon for the initial setup of the electronic device, and the at least one icon is movable based on a touch input detected through the touch screen of the electronic device.

In various embodiments, the initial setup may include at least one of an account setting, data synchronization, an authentication setting, and an application setting.

In various embodiments, the displaying of the icon may include: displaying the at least one icon using a presentation layer of the home screen of the electronic device or a separate different presentation layer.

In various embodiments, the displaying of the icon may include: displaying a detailed setting window for one of the one or more icons.

In various embodiments, the method may further include: in response to the initial booting of the electronic device, setting a language of the electronic device; and performing a use agreement procedure for the electronic device based on the language setting, and the displaying of the at least one icon may include, in response to the completion of the use agreement procedure, displaying at least one icon for the initial setup the electronic device.

In various embodiments, the method may further include: changing the display position of the at least one icon so as to correspond to input information corresponding to the at least one icon; and when the at least one icon overlaps with another icon displayed on the home screen, automatically changing the display position of the at least one icon.

In various embodiments, the method may further include: when the at least one icon is adjacent to another icon displayed on the home screen, updating a display parameter of the icon corresponding to attributes of the other one of one or more icons.

In various embodiments, the attributes of another icon may include at least one of the type of an application and service characteristics of the application corresponding to another icon.

In various embodiments, the display parameter of the icon may include at least one of a color, shape, size, and transparency of the icon.

In various embodiments, the method may further include: when the execution input of the application is detected, updating the display parameter of the icon corresponding to the characteristics of the application, from among the one or more icons.

In various embodiments, the method may further include: when the setup of the required setting of an initial setup corresponding to the at least one icon is complete, activating a delete instruction for the at least one icon; and displaying a delete icon in response to the occurrence of the delete event for the at least one icon.

In various embodiments, the method may further include: when the initial setup corresponding to at least one icon is complete, removing or updating the display of the at least one icon.

In various embodiments, the method may further include: when the initial setup corresponding to the at least one icon is complete, displaying an icon for an additional setting.

In various embodiments, the additional setting may include a user profile setting.

In various embodiments, the method may further include: transmitting the initialization information corresponding to the at least one icon to at least one other electronic device.

An electronic device and an operating method thereof according to various embodiments may perform an initial setup of the electronic device using an icon of the home screen so that during the initial booting of the electronic device, a series of operations for the initial setup up of the electronic device is not used so as to improve the usability of the electronic device.

An electronic device and an operating method thereof according to various embodiments may display an icon for the initial setup on the home screen so that a user of the electronic device easily perform the initial setup or easily edit the initial setup.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a unit of an integrated component element or a part thereof. The "module" may be a unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute a function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The embodiments disclosed herein are proposed to help with description and comprehension of disclosed technical contents, and do not limit the scope of various embodiments of the present disclosure. Therefore, the scope of the various embodiments of the present disclosure should be construed as including all modifications or various other embodiments based on the spirit and scope of the various embodiments of the present disclosure.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device comprising:
    a touch screen; and
    at least one processor electrically connected to the touch screen, wherein the at least one processor is configured to:
    control the touch screen to display at least one application icon on a first layer of a home screen while initial booting process is performed to initialize the electronic device, with at least one initial setup icon on a second layer overlay on the first layer, each of the at least one initial setup icon being an icon for an initial setting of default information related to at least one function of the electronic device,
    while at least one initial setup icon is displayed on the home screen, receive, through the touch screen, a first user input for executing a first application that corresponds to a first application icon included in the at least one application icon,
    in response to receiving the first user input, identify whether an uncompleted initial setup associated with the first application exists,
    in response to identifying that the uncompleted initial setup exists, control the touch screen to display a first initial setup icon distinguishable from among the at least one initial setup icon, the first initial setup icon being related to the uncompleted initial setup,
    while the first initial setup icon is distinguishably displayed, receive, through the touch screen, a second user input for an initial setting of default information for the first application related to the first initial setup icon,
    in response to receiving the second user input, control the touch screen to display a first setting window, on a part of the home screen, for setting the default information for the first application related to the first initial setup icon,
    in response to receiving a third user input on the first setting window, complete the uncompleted initial setup of the first application related to the first initial setup icon, based on the third user input on the first setting window,
    in response to completing the uncompleted initial setup related to the first initial setup icon, remove the first initial setup icon from the second layer overlay on the first layer of home screen,
    in response to identifying that the uncompleted initial setup further exists, control the touch screen to display a second initial setup icon distinguishable from among the at least one initial setup icon, the second initial setup icon being related to the uncompleted initial setup, and
    in response to identifying that the uncompleted initial setup does not exist, execute the first application.

2. The electronic device of claim 1, wherein the at least one initial setup icon comprises at least one icon for initial setting of default information corresponding to at least one of an account setting, data synchronization, an authentication setting, or an application setting.

3. The electronic device of claim 1, wherein the at least one processor is further configured to:
    perform the initial booting process to initialize the electronic device;
    in response to the initial booting of the electronic device, set a language of the electronic device; and
    perform a use agreement procedure for the electronic device based on the language;
    wherein the display of the at least one initial setup icon on the touch screen is performed after the use agreement procedure is completed.

4. The electronic device of claim 1, wherein, in response to the at least one initial setup icon overlapping with the at least one application icon displayed on the home screen, the at least one processor is further configured to automatically change a display position of the at least one initial setup icon.

5. The electronic device of claim 1, wherein, in response to the at least one initial setup icon being located adjacent to a second application icon included in the at least one application icon, the at least one processor is further configured to update a display parameter of the at least one initial setup icon such that the display parameter corresponds to the second application icon.

6. The electronic device of claim 1, wherein the at least one processor is further configured to:
   when the uncompleted initial setup is identified, control the touch screen to display guidance information on the first initial setup icon corresponding to the uncompleted initial setup.

7. The electronic device of claim 1, wherein, in response to completion of a required setup instruction of the uncompleted initial setup corresponding to the at least one initial setup icon, the at least one processor is further configured to activate a delete instruction for the at least one initial setup icon.

8. The electronic device of claim 1, wherein, in response to completion of the uncompleted initial setup corresponding to the at least one initial setup icon, the at least one processor is further configured to display an additional icon for a user profile setting on the touch screen.

9. The electronic device of claim 1, further comprising a communication circuit,
   wherein the at least one processor is further configured to transmit the initial setting of the default information corresponding to the at least one initial setup icon to a second electronic device through the communication circuit.

10. A method for operating an electronic device, comprising:
    displaying, on a touch screen of the electronic device, at least one application icon on a first layer of a home screen through a touch screen while initial booting process is performed to initialize the electronic device, with at least one initial setup icon on a second layer overlay on the first layer, each of the at least one initial setup icon being an icon for an initial setting of default information related to at least one function of the electronic device;
    while at least one initial setup icon is displayed on the home screen, receiving, through the touch screen, a first user input for executing a first application that corresponds to a first application icon included in the at least one application icon;
    in response to receiving the first user input, identifying whether an uncompleted initial setup associated with the first application exists;
    in response to identifying that the uncompleted initial setup exists, displaying a first initial setup icon distinguishable from among the at least one initial setup icon, the first initial setup icon being related to the uncompleted initial setup;
    while the first initial setup icon is distinguishably displayed, receiving, through the touch screen, a second user input for an initial setting of default information for the first application related to the first initial setup icon;
    in response to receiving the second user input, displaying a first setting window, on a part of the home screen, for setting the default information for the first application related to the first initial setup icon;
    in response to receiving a third user input on the first setting window, completing the uncompleted initial setup of the first application related to the first initial setup icon, based on the third user input on the first setting window;
    in response to completing the uncompleted initial setup related to the first setup icon, removing the first initial setup icon from the second layer overlay on the first layer of home screen;
    in response to identifying that the uncompleted initial setup further exists, displaying a second initial setup icon distinguishable from among the at least one initial setup icon, the second initial setup icon being related to the uncompleted initial setup; and
    in response to identifying that the uncompleted initial setup does not exist, executing the first application.

11. The method of claim 10, wherein the at least one initial setup icon comprises at least one icon for initial setting of default information corresponding to at least one of an account setting, data synchronization, an authentication setting, or an application setting.

12. The method of claim 10, further comprising:
    performing the initial booting process to initialize the electronic device;
    setting a language of the electronic device in response to the initial booting of the electronic device; and
    performing a use agreement procedure for the electronic device based on the language, and
    wherein the displaying of the at least one initial setup icon on the touch screen is performed after performance of the use agreement procedure is completed.

13. The method of claim 10, further comprising:
    changing a display position of the at least one icon based on input information corresponding to the at least one initial setup icon; and
    in response to the at least one initial setup icon overlapping with the at least one application icon displayed on a home screen, automatically changing the display position of the at least one initial setup icon.

14. The method of claim 10, further comprising, in response to the at least one initial setup icon being located adjacent to a second application icon included in the at least one application icon, updating a display parameter of the at least one initial setup icon such that the display parameter corresponds to the second application icon.

15. The method of claim 10, further comprising,
    when the uncompleted initial setup is identified, controlling the touch screen to display guidance information on the first initial setup icon corresponding to the uncompleted initial setup.

16. The method of claim 10, further comprising: in response to completion of a required setup instruction of the uncompleted initial setup corresponding to the at least one icon, activating a delete instruction for the at least one initial setup icon; and displaying a delete icon after completion of the delete instruction for the at least one initial setup icon.

17. The method of claim 10, further comprising, in response to completion of the uncompleted initial setup corresponding to at least one initial setup icon, removing or updating the display of the at least one initial setup icon.

18. The method of claim 10, further comprising, in response to completion of the uncompleted initial setup corresponding to the at least one initial setup icon, displaying an additional icon for a user profile setting.

* * * * *